(12) United States Patent
Tonisson

(10) Patent No.: US 7,190,376 B1
(45) Date of Patent: Mar. 13, 2007

(54) METHOD OF COMPILING COMPOSITING EXPRESSIONS FOR OPTIMISED RENDERING

(75) Inventor: Alan Tonisson, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,698

(22) Filed: Mar. 14, 2000

(30) Foreign Application Priority Data

Mar. 16, 1999 (AU) .................................. PP9237

(51) Int. Cl.
*G09G 5/02* (2006.01)
(52) U.S. Cl. ..................................... 345/629
(58) Field of Classification Search ................ 345/619, 345/620, 629
See application file for complete search history.

(56) References Cited

U.S. PATENT DOCUMENTS

| 5,724,494 | A | | 3/1998 | Politis ......................... 395/134 |
| 5,745,121 | A | * | 4/1998 | Politis ......................... 345/619 |
| 5,982,381 | A | * | 11/1999 | Joshi et al. .................. 345/629 |
| 6,014,147 | A | * | 1/2000 | Politis et al. ................ 345/620 |
| 6,137,497 | A | * | 10/2000 | Strunk et al. ............... 345/620 |
| 6,184,891 | B1 | * | 2/2001 | Blinn ........................... 345/426 |
| 6,262,747 | B1 | * | 7/2001 | Rocheleau et al. ......... 345/619 |
| 6,421,061 | B1 | * | 7/2002 | Sudoh ......................... 345/629 |
| 6,483,519 | B1 | * | 11/2002 | Long et al. .................. 345/619 |

FOREIGN PATENT DOCUMENTS

| EP | 0 809 213 A2 | 11/1997 |
| WO | WO 97/06512 | 2/1997 |

OTHER PUBLICATIONS

Compositing digital images Thomas Porter, Tom Duff, Jan. 1984. ☐☐*

Visibility sorting and compositing without splitting for image layer decompositions John Snyder, Jed Lengyel , Jul. 1998. ☐ ☐*

PixelFlow: high-speed rendering using image composition Steven Molnar, John Eyles, John Poulton , Jul. 1992. ☐☐*

A montage method: the overlaying of the computer generated images onto a background photograph Eihachiro Nakamae, Koichi Harada, Takao Ishizaki, Tomoyuki Nishita, Aug. 1986. ☐☐*

T. Porter, et al., "Compositing Digital Images," Computer Graphics, vol. 18, No. 3 (Jul., 1984); pp. 253-259.

M. Shantzis, "A Model For Efficient And Flexible Image Computing," Computer Graphics Proceedings, Annual Conference Series (1994), pp. 147-154.

* cited by examiner

*Primary Examiner*—Jeffery Brier
*Assistant Examiner*—J. Amini
(74) *Attorney, Agent, or Firm*—Fitzpatrick, Cella, Harper & Scinto

(57) ABSTRACT

A method of creating an image utilizing a table of levels known as a "level activation table" (34) is disclosed. The method uses the level activation table to optimally evaluate a given compositing expression such that the number of pixel operations needed to evaluate the expression is minimized. The method determines the smallest regions in which compositing operations need to be performed and uses these regions to produce the level activation tables where clipping is applied to operations in order to avoid redundant and/or incorrect pixel operations. The method is preferably used in a compositing model in which objects are composited onto a page using a stack machine and an associated compositing stack (38). The stack 38 may be manipulated using standard stack operations such as push, pull and pop. Instructions for the stack machine are taken from the level activation table 34.

51 Claims, 17 Drawing Sheets

| Operation | Region | Value | Level | Stack | Result | Correct |
|---|---|---|---|---|---|---|
| A over B | A ∩ B | A over B | over A | B | A over B | A over pop |
|  | A ∩ B̄ | A |  | ? | A over ? | push A |
|  | Ā ∩ B | B |  | B | B | no-op |
|  | Ā ∩ B̄ | glass |  | ? | ? | no-op |
| A rover B | A ∩ B | A rover B | rover A | B | A rover B | A rover pop |
|  | A ∩ B̄ | A |  | ? | A rover ? | push A |
|  | Ā ∩ B | B |  | B | B | no-op |
|  | Ā ∩ B̄ | glass |  | ? | ? | no-op |
| A in B | A ∩ B | A in B | in A | B | A in B | A in pop |
|  | A ∩ B̄ | glass |  | ? | A in ? | no-op |
|  | Ā ∩ B | glass |  | B | B | pop |
|  | Ā ∩ B̄ | glass |  | ? | ? | no-op |
| A rin B | A ∩ B | A rin B | rin A | B | A rin B | A rin pop |
|  | A ∩ B̄ | glass |  | ? | A rin ? | no-op |
|  | Ā ∩ B | glass |  | B | B | pop |
|  | Ā ∩ B̄ | glass |  | ? | ? | no-op |
| A out B | A ∩ B | A out B | out A | B | A out B | A out pop |
|  | A ∩ B̄ | A |  | ? | A out ? | push A |
|  | Ā ∩ B | glass |  | B | B | pop |
|  | Ā ∩ B̄ | glass |  | ? | ? | no-op |
| A rout B | A ∩ B | A rout B | rout A | B | A rout B | A rout pop |
|  | A ∩ B̄ | glass |  | ? | A rout ? | no-op |
|  | Ā ∩ B | B |  | B | B | no-op |
|  | Ā ∩ B̄ | glass |  | ? | ? | no-op |
| A atop B | A ∩ B | A atop B | atop A | B | A atop B | A atop pop |
|  | A ∩ B̄ | glass |  | ? | A atop ? | no-op |
|  | Ā ∩ B | B |  | B | B | no-op |
|  | Ā ∩ B̄ | glass |  | ? | ? | no-op |
| A ratop B | A ∩ B | A ratop B | ratop A | B | A ratop B | A ratop pop |
|  | A ∩ B̄ | A |  | ? | A ratop ? | push A |
|  | Ā ∩ B | glass |  | B | B | pop |
|  | Ā ∩ B̄ | glass |  | ? | ? | no-op |
| A xor B | A ∩ B | A xor B | xor A | B | A xor B | A xor pop |
|  | A ∩ B̄ | A |  | ? | A xor ? | push A |
|  | Ā ∩ B | B |  | B | B | no-op |
|  | Ā ∩ B̄ | glass |  | ? | ? | no-op |

Table 1

| Operation | Region | Value | Level | Stack | Result | Correct |
|---|---|---|---|---|---|---|
| A over B | A ∩ B | A over B | over | A,B | A over B | over |
| | A ∩ B̄ | A | | A,? | A over ? | no-op |
| | Ā ∩ B | B | | B,? | B over ? | no-op |
| | Ā ∩ B̄ | glass | | ?,? | ? over ? | no-op |
| A rover B | A ∩ B | A rover B | rover | A,B | A rover B | rover |
| | A ∩ B̄ | A | | A,? | A rover ? | no-op |
| | Ā ∩ B | B | | B,? | B rover ? | no-op |
| | Ā ∩ B̄ | glass | | ?,? | ? rover ? | no-op |
| A in B | A ∩ B | A in B | in | A,B | A in B | in |
| | A ∩ B̄ | glass | | A,? | A in ? | pop |
| | Ā ∩ B | glass | | B,? | B in ? | pop |
| | Ā ∩ B̄ | glass | | ?,? | ? in ? | no-op |
| A rin B | A ∩ B | A rin B | rin | A,B | A rin B | rin |
| | A ∩ B̄ | glass | | A,? | A rin ? | pop |
| | Ā ∩ B | glass | | B,? | B rin ? | pop |
| | Ā ∩ B̄ | glass | | ?,? | ? rin ? | no-op |
| A out B | A ∩ B | A out B | out | A,B | A out B | out |
| | A ∩ B̄ | A | | A,? | A out ? | no-op |
| | Ā ∩ B | glass | | B,? | B out ? | pop |
| | Ā ∩ B̄ | glass | | ?,? | ? out ? | no-op |
| A rout B | A ∩ B | A rout B | rout | A,B | A rout B | rout |
| | A ∩ B̄ | glass | | A,? | A rout ? | pop |
| | Ā ∩ B | B | | B,? | B rout ? | no-op |
| | Ā ∩ B̄ | glass | | ?,? | ? rout ? | no-op |
| A atop B | A ∩ B | A atop B | atop | A,B | A atop B | atop |
| | A ∩ B̄ | glass | | A,? | A atop ? | pop |
| | Ā ∩ B | B | | B,? | B atop ? | no-op |
| | Ā ∩ B̄ | glass | | ?,? | ? atop ? | no-op |
| A ratop B | A ∩ B | A ratop B | ratop | A,B | A ratop B | ratop |
| | A ∩ B̄ | A | | A,? | A ratop ? | no-op |
| | Ā ∩ B | glass | | B,? | B ratop ? | pop |
| | Ā ∩ B̄ | glass | | ?,? | ? ratop ? | no-op |
| A xor B | A ∩ B | A xor B | xor | A,B | A xor B | xor |
| | A ∩ B̄ | A | | A,? | A xor ? | no-op |
| | Ā ∩ B | B | | B,? | B xor ? | no-op |
| | Ā ∩ B̄ | glass | | ?,? | ? xor ? | no-op |

Table 2

| Expression | Active Region |
|---|---|
| A over B | $A \cup B$ |
| A rover B | $A \cup B$ |
| A in B | $A \cap B$ |
| A rin B | $A \cap B$ |
| A out B | A |
| A rout B | B |
| A atop B | B |
| A ratop B | A |
| A xor B | $A \cup B$ |

Table 3

| Operation | Levels | Clip |
|---|---|---|
| A over B | over A | clip ∩ B |
| | push A | clip ∩ $\bar{B}$ |
| | table B | clip |
| A rover B | rover A | clip ∩ B |
| | push A | clip ∩ $\bar{B}$ |
| | table B | clip |
| A in B | in A | clip ∩ B |
| | table B | clip ∩ A |
| A rin B | rin A | clip ∩ B |
| | table B | clip ∩ A |
| A out B | out A | clip ∩ B |
| | push A | clip ∩ $\bar{B}$ |
| | table B | clip ∩ A |
| A rout B | rout A | clip ∩ B |
| | table B | clip |
| A atop B | atop A | clip ∩ B |
| | table B | clip |
| A ratop B | ratop A | clip ∩ B |
| | push A | clip ∩ $\bar{B}$ |
| | table B | clip ∩ A |
| A xor B | xor A | clip ∩ B |
| | push A | clip ∩ $\bar{B}$ |
| | table B | clip |

Table 4

| Operation | Levels | Clip |
|---|---|---|
| A over B | over | clip ∩ A ∩ B |
| | table A | clip |
| | table B | clip |
| A rover B | rover | clip ∩ A ∩ B |
| | table A | clip |
| | table B | clip |
| A in B | in | clip ∩ A ∩ B |
| | table A | clip ∩ B |
| | table B | clip ∩ A |
| A rin B | rin | clip ∩ A ∩ B |
| | table A | clip ∩ B |
| | table B | clip ∩ A |
| A out B | out | clip ∩ A ∩ B |
| | table A | clip |
| | table B | clip ∩ A |
| A rout B | rout | clip ∩ A ∩ B |
| | table A | clip ∩ B |
| | table B | clip |
| A atop B | atop | clip ∩ A ∩ B |
| | table A | clip ∩ B |
| | table B | clip |
| A ratop B | ratop | clip ∩ A ∩ B |
| | table A | clip |
| | table B | clip ∩ A |
| A xor B | xor | clip ∩ A ∩ B |
| | table A | clip |
| | table B | clip |

Table 5

| Expression | Clip A | Clip B | Active Region | Opaque Region |
|---|---|---|---|---|
| A over B | A | $B \cap \bar{O}_A$ | $A \cup B$ | $O_A \cup O_B$ |
| A rover B | $A \cap \bar{O}_B$ | B | $A \cup B$ | $O_A \cup O_B$ |
| A in B | $A \cap B$ | $A \cap B \cap \bar{O}_B$ | $A \cap B$ | $O_A \cap O_B$ |
| A rin B | $A \cap B \cap \bar{O}_A$ | $A \cap B$ | $A \cap B$ | $O_A \cap O_B$ |
| A out B | $A \cap B \cap \bar{O}_B$ | $A \cap B \cap \bar{O}_A$ | $A \cap \bar{O}_B$ | $\bar{B} \cap O_A$ |
| A rout B | $A \cap B$ | $A \cap B \cap \bar{O}_A$ | $B \cap \bar{O}_A$ | $\bar{A} \cap O_B$ |
| A atop B | $A \cap B$ | $A \cap B$ | B | $O_B$ |
| A ratop B | $A \cap B \cap \bar{O}_B$ | $A \cap B$ | A | $O_A$ |
| A xor B | $A \cap (\bar{O}_B \cup \bar{O}_A)$ | $B \cap (\bar{O}_B \cup \bar{O}_A)$ | $(A \cup B) \cap (\bar{O}_A \cup \bar{O}_B)$ | $(\bar{B} \cap O_A) \cup (\bar{A} \cap O_B)$ |

Table 6

METHOD OF COMPILING COMPOSITING EXPRESSIONS FOR OPTIMISED RENDERING

FIELD OF THE INVENTION

The present invention relates to the creation of computer-generated images both in the form of still pictures and video imagery and, in particular, relates to an efficient process and apparatus for creating an image made up by compositing multiple graphical objects.

BACKGROUND

Computer generated images are typically made up of many differing components or graphical objects which are composited together and rendered to create a final image. Each graphical object is generally represented as a fill type and a set of outlines. Graphical objects may be rendered by combining them onto a page using compositing operations. An "opacity channel" (also known as a "matte", an "alpha channel", or simply "opacity") is also commonly used as part of the representation of a graphical object. The opacity channel contains information regarding the transparent nature of each element. The opacity channel is typically stored alongside each instance of a colour, so that, for example, a pixel-based image with opacity stores an opacity value as part of the representation of each pixel. In this fashion each graphical object may be interpreted as occupying the entire image area, and the outlines of the graphical object can therefore define a region outside of which the object is fully transparent. This region is called the "active region" of the object. A graphical object without explicit opacity channel information is typically understood to be fully opaque within the outlines of the object, and assumed to be completely transparent outside those outlines.

One means for systematically representing an image in terms of its constituent elements and which facilitates in later rendering is an "expression tree". Expression trees typically comprise a plurality of nodes including leaf nodes, unary nodes and binary nodes. Nodes of higher degree, or of alternative definition, may also be used. A leaf node, being the outermost node of an expression tree, has no descendent nodes and represents a primitive constituent of an image. Unary nodes represent an operation which modifies the pixel data coming out of the part of the tree below the unary operator. Unary nodes include such operations as colour conversions and convolutions blurring, etc). A binary node typically branches to left and right subtrees, wherein each subtree is itself an expression tree comprising at least one leaf node. Binary nodes represent an operation which combines the pixel data of its two children to form a single result. For example, a binary node may be one of the standard compositing operators such as over, in, out, atop and alpha-XOR, examples of which and others are seen in FIG. 2. The compositing operations represented by the Porter-Duff compositing operators are arithmetic or bitwise operations including opacity, which are performed on the component values of the colours of a graphical object.

Several of the above types of nodes may be combined to form the expression tree. An example of this is shown in FIG. 1. The result of the left-hand side of the expression tree illustrated in FIG. 1 may be interpreted as an image (Image 1) being colour (Conversion) clipped (In) to spline boundaries (Path). This construct is composited with a second image (Image 2).

Although the active region of a graphical object may of itself be of a certain size, it need not be entirely visible in a final image, or only a portion of the active region may have an effect on the final image. For example, assume an image of a certain size is to be displayed on a display. If the image is positioned so that only the top left corner of the image is displayed by the display device, the remainder of the image is not displayed. The final image as displayed on the display device thus comprises the visible portion of the image, and the invisible portion in such a case need not be rendered.

Another way in which only a portion of the active region of an object may have an effect is when the portion is obscured by another object. For example, a final image to be displayed (or rendered) may comprise one or more opaque graphical objects, some of which obscure other graphical objects. Hence, the obscured objects have no effect on the final image.

Two conventional rendering models include "frame buffer rendering" and "pixel sequential rendering". Conventional frame buffer rendering is based on the "painter's algorithm" which involves rendering multiple objects one at a time into a frame buffer. A compositing operation is carried out for every pixel within the boundaries of an object. A simple frame buffer approach is not sophisticated enough to render arbitrary expressions consisting of compositing operations involving transparency, and extra frame buffers may be required to render such expressions. The extra frame buffers are needed to store intermediate results.

Pixel sequential rendering as opposed to the "object sequential rendering" used in conventional frame buffer based systems involves performing all of the compositing operations required to produce a single pixel before moving on to the next pixel. Interactive frame rates of the order of 15 frames per second and greater can be achieved by such conventional methods, because the actual pixel operations are quite simple. Thus, conventional systems are fast enough to produce acceptable frame rates without requiring complex code. However, this is certainly not true in a compositing environment consisting of complex expression trees since the per-pixel cost of compositing is quite high. Complex compositing expressions can lead to redundant pixel compositing operations thus reducing the speed of rendering. This is because typically an image is rendered in 24-bit colour in addition to an 8-bit alpha channel, thus giving 32 bits per pixel. Therefore, each compositing operator of an expression tree has to deal with each of the four channels.

Problems arise with prior art methods that use the conventional methods. These methods are highly inefficient since the per-pixel cost of evaluating the set of compositing operations required to compute each pixel is too high. Further, pixel sequential rendering is designed to work correctly under the assumption that a particular compositing operation used to render a pixel does not affect pixels outside of the boundaries of the object that is being composited. This assumption is not true for all compositing operations. For example, given two graphic objects. A and B, the compositing expression "A rin B", makes pixels outside the boundaries of object A transparent. For this type of compositing expression for which the above assumption does not hold, problems arise when generating compositing instructions.

SUMMARY OF THE INVENTION

It is an object of the present invention to substantially overcome, or ameliorate, one or more of the deficiencies of the above mentioned methods by the provision of a method for creating an image made up by compositing multiple components.

According to one aspect of the present invention there is provided a method of creating an image, said image to be formed by compositing at least a plurality of graphical objects, each said object having a predetermined outline, said method comprising the steps of:

determining an expression for each of a plurality of active regions, each said active region being defined by at least one region outline following at least one of said predetermined outlines or parts thereof;

determining expressions representing each of a plurality of effective regions depending on at least one characteristic of at least one active region, wherein each said effective region has a corresponding compositing operation; and applying said corresponding compositing operations substantially to said effective regions to create said image.

According to another aspect of the present invention there is provided a method of creating an image, said image to be formed by compositing at least a plurality of graphical objects, each said object having a predetermined outline, said method comprising the steps of:

dividing a space in which said outlines are defined into a plurality of regions, each said region being defined by at least one region outline following at least one of said predetermined outlines or parts thereof;

determining a plurality of further regions depending on at least one characteristic of at least one region, wherein each said further region has a corresponding compositing operation;

mapping said further regions and corresponding compositing operations into a compositing table, comprising a plurality of levels, wherein each said level of said compositing table represents at least one operation for rendering an object or parts thereof or represents an outline for clipping at least one other level; and compositing said image using said compositing table.

According to still another aspect of the present invention there is provided a method of optimising an expression representing the layout of one or more objects, each said object having a predetermined outline, said method comprising the steps of:

dividing a space in which said outlines are defined into a plurality of regions, each said region being defined by at least one region outline substantially following at least one of said predetermined outlines or parts thereof;

determining a plurality of further regions depending on at least one characteristic of at least one of said regions, wherein each said further region has a corresponding compositing operation; and forming said optimised expression from said plurality of further regions and corresponding compositing operations.

According to still another aspect of the present invention there is provided a method of creating an image, said image to be formed by evaluating a hierarchically structured compositing expression representing said image, said hierarchically structured compositing expression consisting of a plurality of graphical objects and operations arranged as sub-expressions, each said object having a predetermined outline, said method comprising the steps of:

determining an active region for each sub-expression of said hierarchically structured compositing expression, said active region being dependent on the predetermined outlines of each graphical object and operations contained in said each sub-expression;

calculating an effective region for a corresponding compositing operation of said hierarchically structured compositing expression, depending on at least one characteristic of at least one active region;

mapping each said effective region and corresponding operation into a compositing table, comprising a plurality of levels, wherein each said level of said compositing table represents at least one operation for rendering an object or part thereof constituting at least one of said effective regions; and evaluating said hierarchially structured compositing expression using said compositing table.

According to still another aspect of the present invention there is provided a method of calculating effective regions for a plurality of graphical objects, each said object having a predetermined outline, said method comprising the steps of:

dividing a space in which said outlines are defined into a plurality of active regions, each said active region being defined by at least one region outline following at least one of said predetermined outlines or parts thereof, each said active region having at least one corresponding Boolean expression; and calculating said effective regions depending on at least one characteristic of at least one corresponding Boolean expression, wherein each said effective region has a corresponding Boolean operation.

According to still another aspect of the present invention there is provided a method of creating an image, said image to be formed by compositing at least a plurality of graphical objects, each said object having a predetermined outline, said method comprising the steps of:

dividing a space in which said outlines are defined into a plurality of active regions, each said active region being defined by at least one region outline following at least one of said predetermined outlines or parts thereof;

determining a plurality of effective regions depending on at least one characteristic of at least one active region, wherein each said effective region has a corresponding compositing operation;

mapping said effective regions and corresponding compositing operations into a compositing table, comprising a plurality of levels, wherein each said level of said compositing table represents at least one operation for rendering an object or parts thereof; and compositing said image using said compositing table.

According to still another aspect of the present invention there is provided an apparatus for creating an image, said image to be formed by compositing at least a plurality of graphical objects, each said object having a predetermined outline, said apparatus comprising:

means for determining an expression for each of a plurality of active regions, each said active region being defined by at least one region outline following at least one of said predetermined outlines or parts thereof;

means for determining expressions representing each of a plurality of effective regions depending on at least one characteristic of at least one active region, wherein each said effective region has a corresponding compositing operation; and means for applying said corresponding compositing operations substantially to said effective regions to create said image.

According to still another aspect of the present invention there is provided an apparatus for creating an image, said image to be formed by compositing at least a plurality of graphical objects, each said object having a predetermined outline, said apparatus comprising:

division means for dividing a space in which said outlines are defined into a plurality of regions, each said region being defined by at least one region outline following at least one of said predetermined outlines or parts thereof;

processor means for determining a plurality of further regions depending on at least one characteristic of at least one region, wherein each said further region has a corresponding compositing operation;

mapping means for mapping said further regions and corresponding compositing operations into a compositing table, comprising a plurality of levels, wherein each said level of said compositing table represents at least one operation for rendering an object or parts thereof or represents an outline for clipping at least one other level; and compositing means for compositing said image using said compositing table.

According to still another aspect of the present invention there is provided a computer readable medium for storing a program for apparatus which processes graphical objects intended to form a raster pixel image, said processing comprising a method of creating an image, said image to be formed by compositing at least a plurality of graphical objects, each said object having a predetermined outline, said method program comprising:

code for determining an expression for each of a plurality of active regions, each said active region being defined by at least one region outline following at least one of said predetermined outlines or parts thereof;

code for determining expressions representing each of a plurality of effective regions depending on at least one characteristic of at least one active region, wherein each said effective region has a corresponding compositing operation; and code for applying said corresponding compositing operations substantially to said effective regions to create said image.

According to still another aspect of the present invention there is provided a computer readable medium for storing a program for apparatus which processes graphical objects intended to form a raster pixel image, said processing comprising a method of creating an image, said image to be formed by compositing at least a plurality of graphical objects, each said object having a predetermined outline, said program comprising:

code for dividing a space in which said outlines are defined into a plurality of regions, each said region being defined by at least one region outline following at least one of said predetermined outlines or parts thereof;

code for determining a plurality of further regions depending on at least one characteristic of at least one region, wherein each said further region has a corresponding compositing operation;

code for mapping said further regions and corresponding compositing operations into a compositing table, comprising a plurality of levels, wherein each said level of said compositing table represents at least one operation for rendering an object or parts thereof or represents an outline for clipping at least one other level; and code for compositing said image using said compositing table.

According to still another aspect of the present invention there is provided a method of creating an image, said image to be formed by compositing at least a plurality of graphical objects according to a hierarchical structure representing a compositing expression for said image, said hierarchical structure including a plurality of nodes, said method comprising the steps of:

determining an active region for each sub-expression of said compositing expression, said active region representing a smallest region in which a result of said sub-expression is classified as non-transparent;

determining a further region for each sub-expression of said compositing expression, said further region representing an intersection of all active regions associated with further sub-expressions containing said sub-expression;

determining an effective region for each of said nodes, said effective region being dependent on at least one characteristic of an active region associated with an operand of said node and a further region associated with said node, wherein each said effective region has a corresponding rendering operation; and applying said corresponding rendering operations substantially to said effective regions to create said image.

According to still another aspect of the present invention there is provided a computer readable medium for storing a program for apparatus which processes graphical objects intended to form a raster pixel image, said processing comprising a method of creating an image, said image to be formed by compositing at least a plurality of graphical objects according to a hierarchical structure representing a compositing expression for said image, said hierarchical structure including a plurality of nodes, said program comprising:

code for determining an active region for each sub-expression of said compositing expression, said active region representing a smallest region in which a result of said sub-expression is classified as non-transparent;

code for determining a further region for each sub-expression of said compositing expression, said further region representing an intersection of all active regions associated with further sub-expressions containing said sub-expression;

code for determining an effective region for each of said nodes, said effective region being dependent on at least one characteristic of an active region associated with an operand of said node and a further region associated with said node, wherein each of said effective regions has a corresponding rendering operation; and code for applying said corresponding rendering operations substantially to said effective regions to create said image.

BRIEF DESCRIPTION OF THE DRAWINGS

Embodiments of the invention are described with reference to the drawings, in which.

Figure 1:
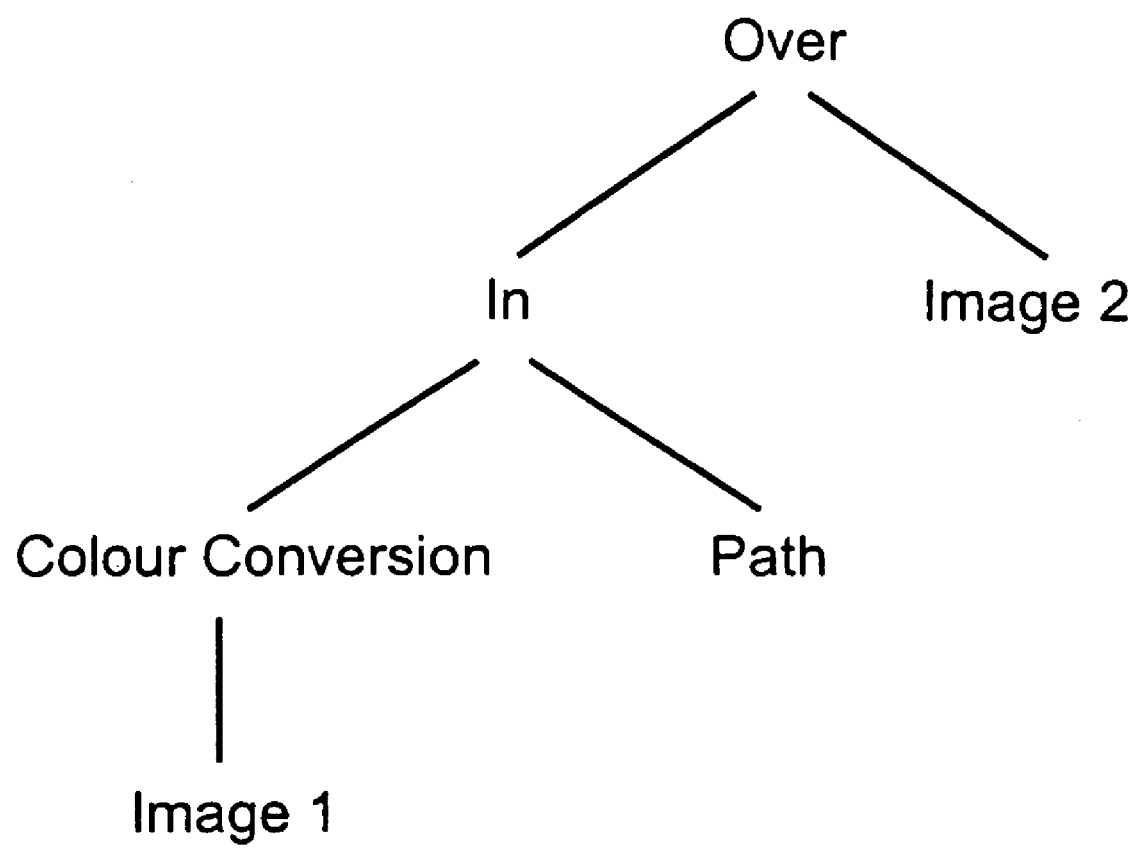
FIG. 1 shows a compositing expression tree containing a number of overlapping objects.
Figure 2:
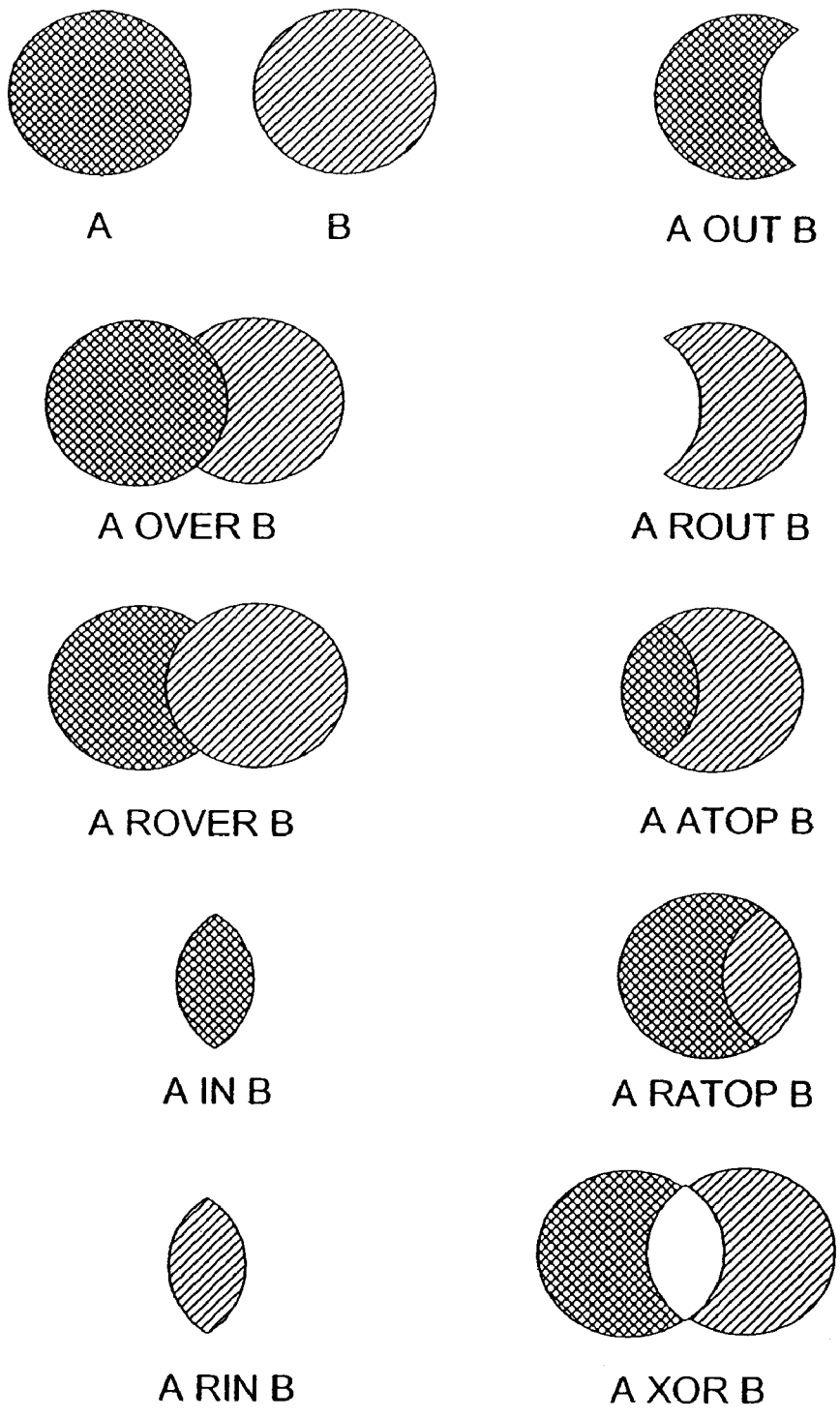
FIG. 2 shows the result of a variety of compositing operators useful with the present invention (these operators themselves, however, form part of the prior art)

Tables 1 and 2 show level activation table entries implementing compositing operations if the active regions of the objects are not considered;

Table 3 shows the rules for calculating the active region of any compositing expression in accordance with the embodiments of the invention;

Table 4 shows the rules for compiling compositing expressions, into level activation tables, whose primary operation has a primitive left operand;

Table 5 shows some rules for compiling compositing expressions, into level activation tables, whose primary operation has a complex left operand;

Table 6 shows a condensed version of Table 5 combined with Table 3 refined; and

Appendix A gives a pseudocode listing of an implementation in accordance with the embodiments of the present invention.

DETAILED DESCRIPTION

Where reference is made in any one or more of the drawings to steps and/or features, which have the same reference numerals, those steps and/or features are for the purposes of the description the same, unless the contrary appears.

Figure 3:
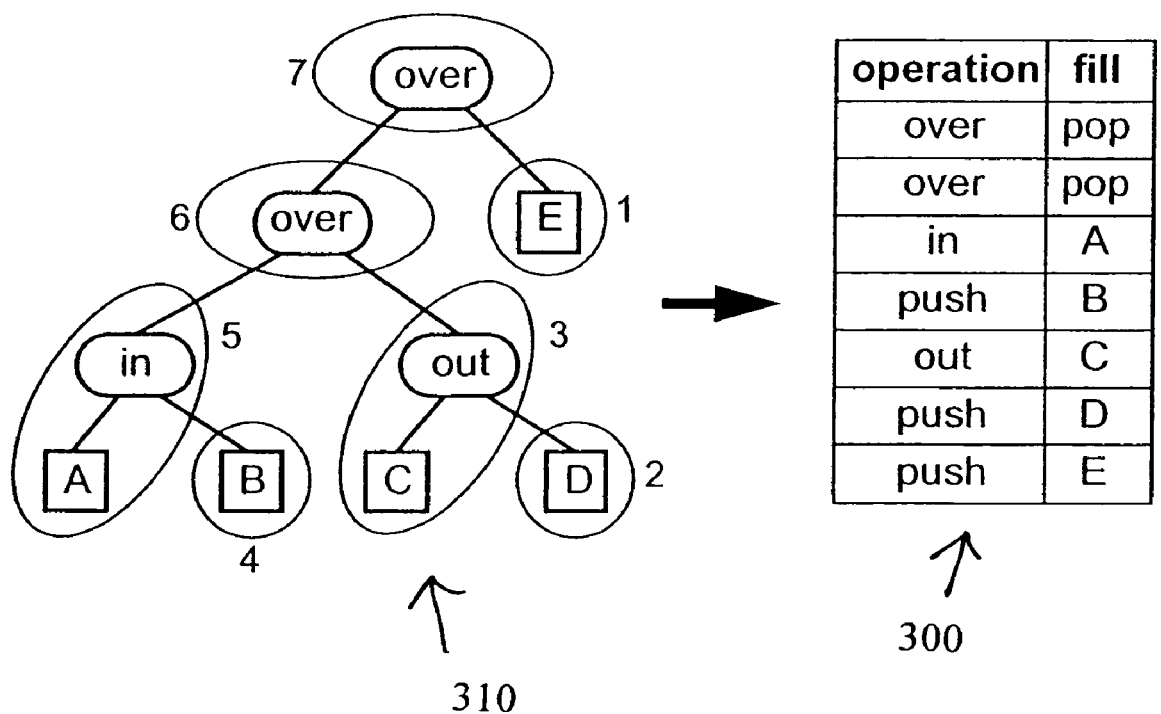
FIG. 3 shows an expression tree with its corresponding level activation table which is formed using natural mapping methods.

The preferred embodiment is a method of creating an image. The preferred embodiment can utilise a table of levels known as a "level activation table" which is used to optimally evaluate a given compositing expression such that the number of pixel operations needed to evaluate the expression is minimised. The preferred embodiment can preferably determine the smallest regions in which compositing operations need to be performed and use these regions to produce level activation tables where clipping is applied to operations in order to avoid redundant and/or incorrect pixel operations. The preferred embodiment is preferably used in a compositing model, described below (see FIG. 11), in which objects are composited onto a page using a stack machine (not illustrated) and an associated compositing stack 38. The stack 38 may be manipulated using standard stack operations such as push, pull and pop. Instructions for the stack machine are taken from the level activation table 34. An example of a level activation table 34 is illustrated in FIG. 3. Each level normally represents a graphical object plus a graphics operation which controls the compositing of the objects associated fill data with the data from exposed levels beneath it. Compositing of the level activation table 34 proceeds from the lowest exposed level, up to the highest. At each level, the operation specified in the level activation table is performed, and the result is pushed onto the compositing stack. The preferred embodiment does not transform expressions. However, expressions can be simplified and pre-processed to minimise resource usage before applying the method of the preferred embodiment.

Figure 9:
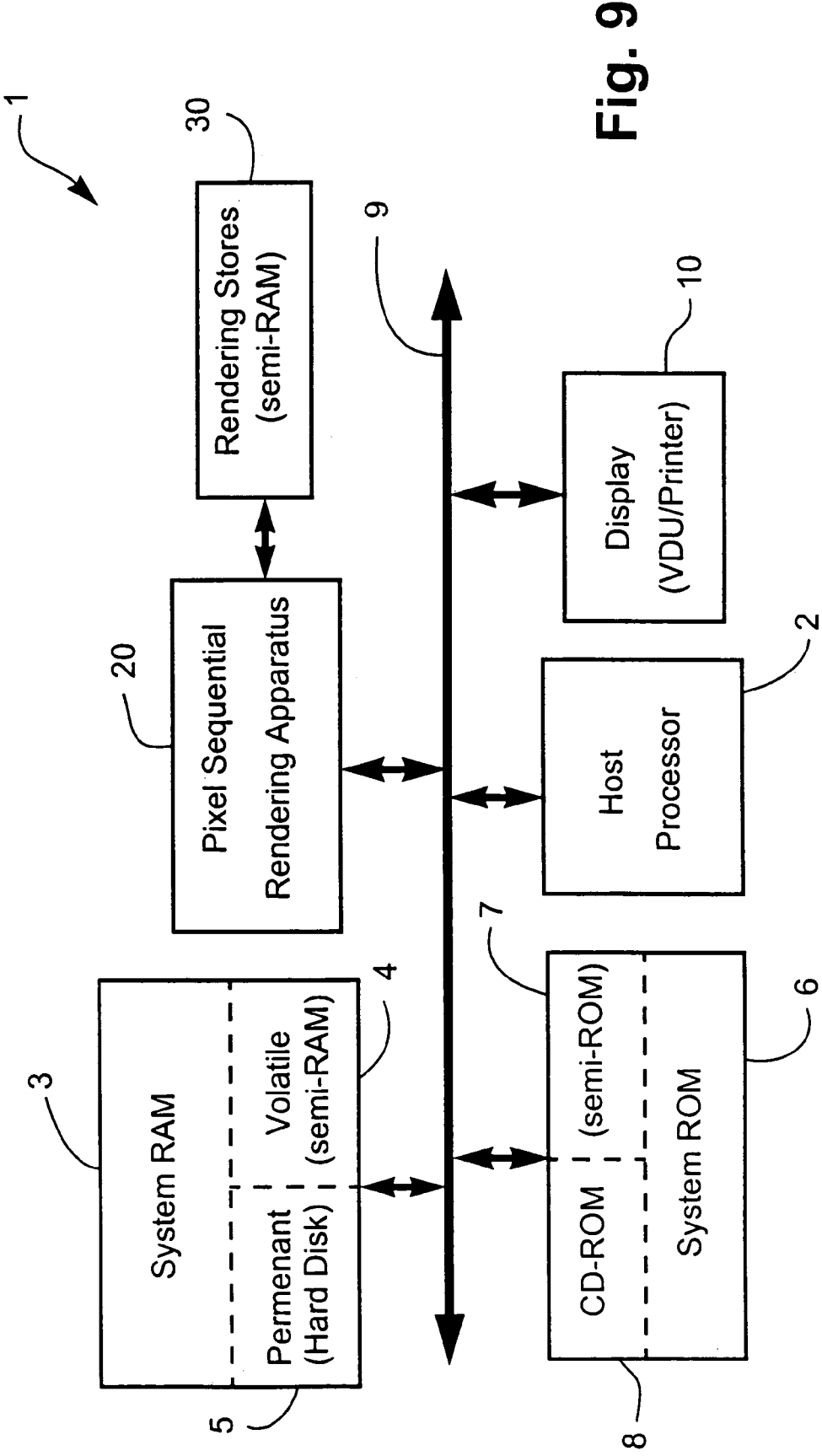
FIG. 9 is a schematic block diagram representation of a computer system incorporating the embodiments of the invention.

FIG. 9 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both of which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 1, a pixel sequential rendering apparatus 20 connects to the bus 9, and in the preferred embodiment is configured for the sequential rendering of pixel-based images derived from graphic object-based descriptions supplied with instructions and data from the system 1 via the bus 9. The apparatus 20 may utilise the system RAM 3 for the rendering of object descriptions although preferably the rendering apparatus 20 may have associated therewith a dedicated rendering store arrangement 30, typically formed of semiconductor RAM.

Figure 10:
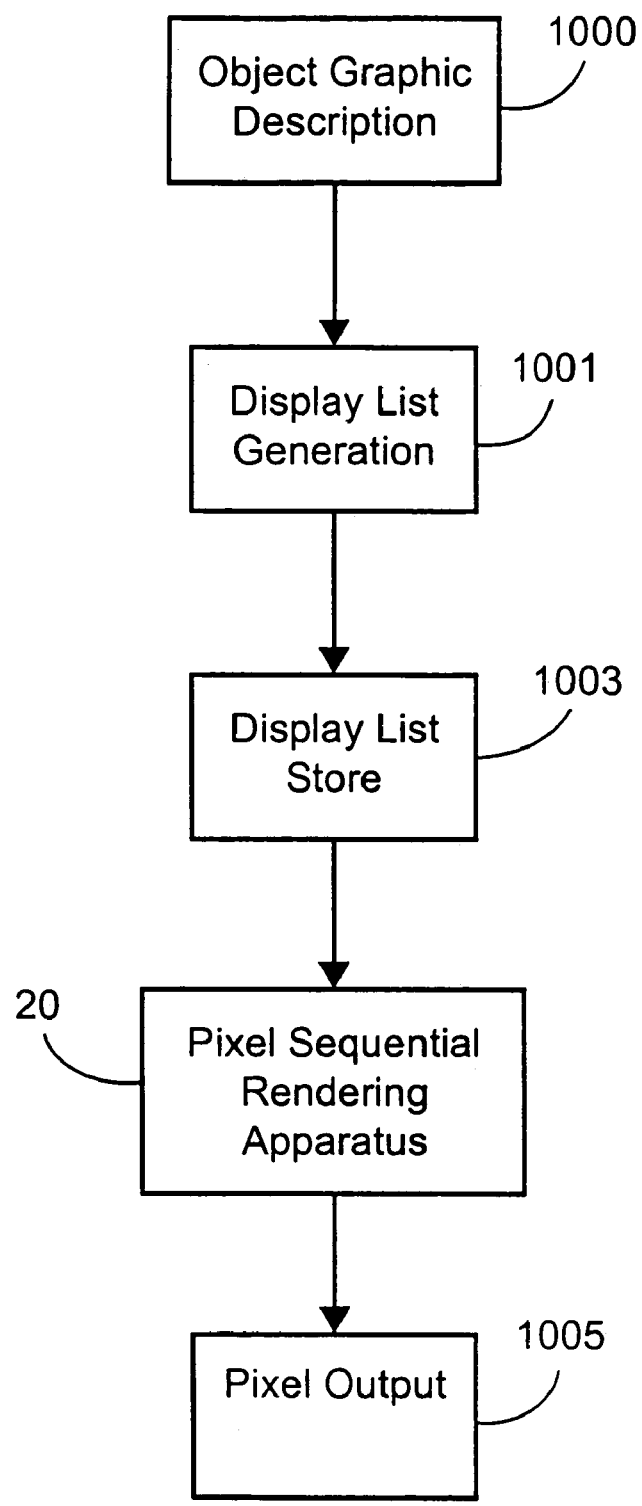
FIG. 10 is a block diagram showing the functional data flow of the embodiments.

Referring now to FIG. 10, a functional data flow diagram of the preferred embodiment is shown. The functional flow diagram of FIG. 10 commences with an object graphic description 1000 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 1000 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves, are also appropriate, and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved), and typically, these are identified by a scan line number thus defining a specific output space in which the curve may be rendered. Having identified the data necessary to describe the graphic objects to the rendered, the graphic systems 1 then performs a display list generation step 1001.

Figure 11:
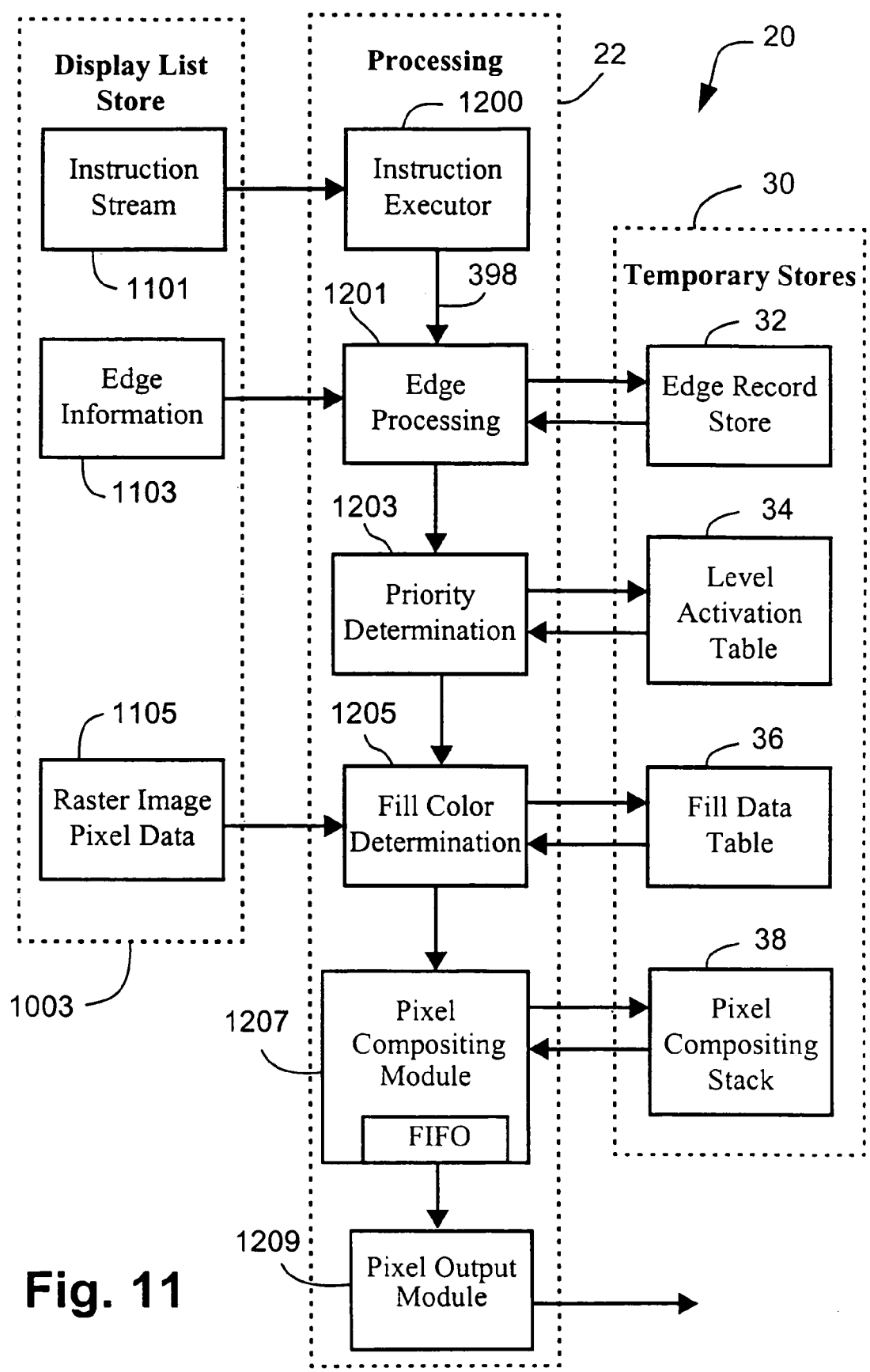
FIG. 11 is a schematic block diagram representation of the pixel sequential rendering apparatus and associated display list and temporary stores of a computer system incorporating the embodiments of the present invention.

The display list generation 1001 is preferably implemented as a software module executing on the host processor 2 with attached ROM 6 and RAM 3. The display list generation 1001 converts an object graphics description, expressed in any one or more of the well known graphic description languages, graphic library calls, or any other application specific format, into a display list. The display list is typically written into a display list store 1003, generally formed within the RAM 4 but which may alternatively be formed within the rendering stores 30. As seen in FIG. 11, the display list store 1003 can include a number of components, one being an instruction stream 101, another being edge information 1103 and where appropriate, raster image pixel data 1105. The instruction stream 1101 includes code interpretable as instructions to be read by the pixel sequential rendering apparatus 20 to render the specific graphic objects desired in any specific image.

The display list store 1003 is read by the pixel sequential rendering apparatus 20, which is typically implemented as an integrated circuit. The pixel sequential rendering apparatus 20 converts the display list into a stream of raster pixels which can be forwarded to another device, for example, a printer, a display, or a memory store.

Although the preferred embodiment describes the pixel sequential rendering apparatus 20 as an integrated circuit, it may be implemented as an equivalent software module executable on a general purpose processing unit, such as the host processor 2. The software module may form part of a computer program product which may be delivered to a user via a computer readable medium, such as a disk device or computer network.

FIG. 11 shows the configuration of the pixel sequential rendering apparatus 20, the display list store 1003 and the temporary rendering stores 30. The processing stages 22 of the pixel-sequential render apparatus 20 include an instruction executor 1200, an edge processing module 1201, a priority determination module 1203, a fill colour determination module 1205, a pixel compositing module 1207, and a pixel output module 1209. The processing operations use the temporary stores 30 which may share the same device (e.g., a magnetic disk or semiconductor RAM) as the display list store 1003, or may be implemented as individual stores for reasons of speed optimisation. The edge processing module 1201 uses an edge record store 32 to hold edge information which is carried forward from scan-line to scan-line. The priority determination module 1203 uses a priority properties and level activation table 34 to hold information about each priority, and the current state of each priority with respect to edge crossings while a scan-line is being rendered. The fill colour determination module 1205 uses a fill data table 36 to hold information required to determine the fill colour of a particular priority at a particular position. The pixel compositing module 1207 uses a pixel compositing stack 38 to hold intermediate results during the determination of an output pixel that requires the colours from multiple priorities to determine its value.

The display list store 1003 and the other stores 32–38 detailed above may be implemented in RAM or any other data storage technology.

The processing steps shown in the embodiment of FIG. 11 take the form of a processing pipeline 22. In accordance with the preferred embodiment, the modules of the pipeline may execute simultaneously on different portions of image data in parallel, with messages passed between them as described below. In another embodiment, each message described below may take the form of a synchronous transfer of control to a downstream module, with upstream processing suspended until the downstream module completes the processing of the message.

The instruction executor 1200 reads and processes instructions from the instruction stream 1101 and formats the instructions into messages that are transferred via an output 398 to the other modules 1201, 1203, 1205 and 1207 within the pipeline 22. Incoming messages which may include set priority data messages, set fill data messages, edge crossing messages and end of scan line messages pass through the edge processing module 1201 and the priority determination module 1203. Edge crossing messages are passed from the edge processing module 1201 in order for a particular scan-line and are loaded into the level activation table 34, which is arranged in priority order, by the priority determination module. The contents of the table 34 are passed as messages to each of the fill colour determination module 1205 for pixel generation, and to the pixel compositing module 1207 for compositing operations.

The fill order determination module 1205 generates repeat messages, colour composite messages (i.e., raster and alpha channel operations) end of pixel messages and end of scan-line messages and passes the messages to the pixel compositing module 1207 which processes the messages in sequence. Upon receipt of a colour composite message, the pixel compositing module 700 typically, and in general terms combines colour and opacity information from the colour composite message with a colour and opacity popped from the pixel compositing stack 38 according to a raster operation and an alpha channel operation from the colour composite message. The pixel compositing module 700 then pushes the result back onto the pixel compositing stack 38.

The computer system 1 configured for rendering computer graphic objects in accordance with the preferred embodiment is described in more detail in Australian Patent Application No. 47509/99 and the corresponding U.S. patent application Ser. No. 09/392,741.

When building the compositing stack, regardless of the compositing operation to be performed, the operation is resolved into four cases (i.e., in the case of a binary operation) or regions of activity for the source (S) and destination (D), as indicated below:

(1) (A) S active, (B) D active;
(2) (A) S active, (B) D active;
(3) (A) S active, (B) D active; and
(4) (A) S inactive, (B) D active.

Case 4 always results in no operation (NOP) being required to be performed, and as a consequence, there exists three different combinations of binary levels for a binary tree. Extensions of this concept to tertiary, quarternary and higher order trees will be apparent to those skilled in the art.

As a consequence, when building the compositing stack 38 (for a binary tree), one of the three above identified operations is required to be implemented by the stack 38. Further, the different operations associated with each object in the stack depend upon what is below the object in the level activation table 34. For rendering of objects using simple OVER operations, as occurs in the Painter's Algorithm, this poses no problem. However, for other compositing operations, the stack operations need to be changed depending on the activity of the operands of the compositing operation. This problem can be overcome by clipping the levels providing the stack operations. However, the number of clips applied to each level can rapidly rise, creating difficulties in handling the stack operations. The preferred embodiment provides a method of compiling an optimal level activation table such that the number of pixel operations needed to evaluate an expression, for the creation of an image, is minimised.

Figure 12:
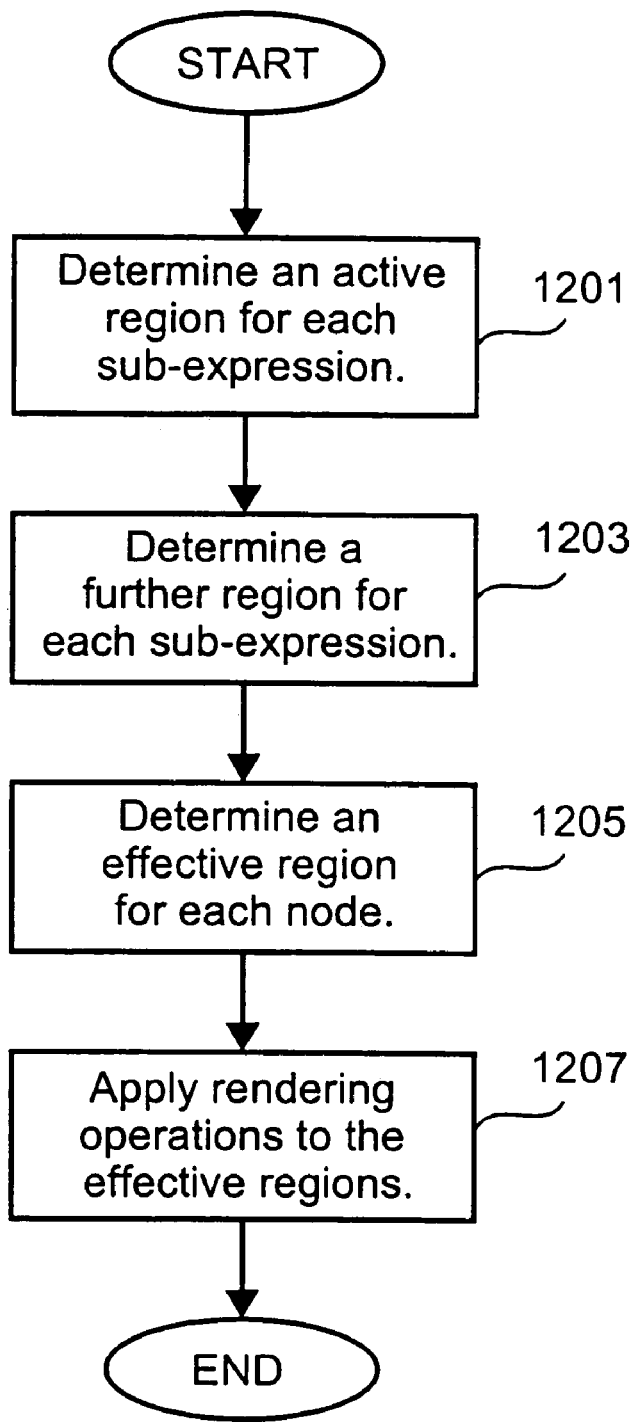
FIG. 12 is a flow chart showing a method of creating an image in accordance with one embodiment of the present invention.

FIG. 12 is a flow diagram showing a method of creating an image in accordance with the preferred embodiment of the present invention. The image is formed by compositing graphical objects according to an expression tree representing a compositing expression for the image. Each node in the expression tree corresponds to a sub-expression of the original expression, with the root node of the tree representing the whole expression for the image. The process begins in step 1201, where an active region is determined for each sub-expression of the compositing expression. The active region of a sub-expression represents the smallest region in which the result of the sub-expression is classified as non-transparent. The active region of a node depends on the active regions of the operands (i.e., sub-expressions) of the node and the type of operation represented by the node. As discussed above, the active region of an object is defined to be the region inside the object's outline. The calculation of the active regions in accordance with the embodiments of the invention will be described in more detail below. In the next step 1203, a further region is determined for each sub-expression of the current compositing expression. The further region is calculated as the intersection of the active regions of each sub-expression and/or expression in which a current sub-expression appears. The further region represents the region in which the pixels in the sub-expression contribute to the final displayed image. The further region is referred to is referred to as the clipping region of the sub-expression. The calculation of the further regions in accordance with the embodiment of the invention will be described in more detail below. The process continues in the next step 1205, where an effective region is determined for each node of the expression tree. The effective region is substantially dependent on at least one characteristic of an active region associated with an operand of the node and a further region associated with the node. Each of the calculated effective regions has a corresponding rendering operation whereby the rendering operations include both compositing and stack operations. The effective region represents the region in which a stack operation needs to be generated for an operation associated with the node. The calculation of the effective regions in accordance with the embodiments of the invention will be described in more detail below. In the next step 1207, the corresponding rendering operations are substantially applied to the effective regions in order to create the image.

In accordance with one embodiment of the present invention, step 1207 includes the sub-step of mapping the effective regions and the corresponding rendering operations into a level activation table comprising a plurality of levels. The level activation table in accordance with the embodiments of the invention will be described below. A level is created in the level activation table for each node in the expression tree, with additional clip levels being created as required to clip each level to its effective region. In accordance with the embodiments of the invention, a node that is the left operand of an operation can be combined with the operation into a single level.

Figure 4:
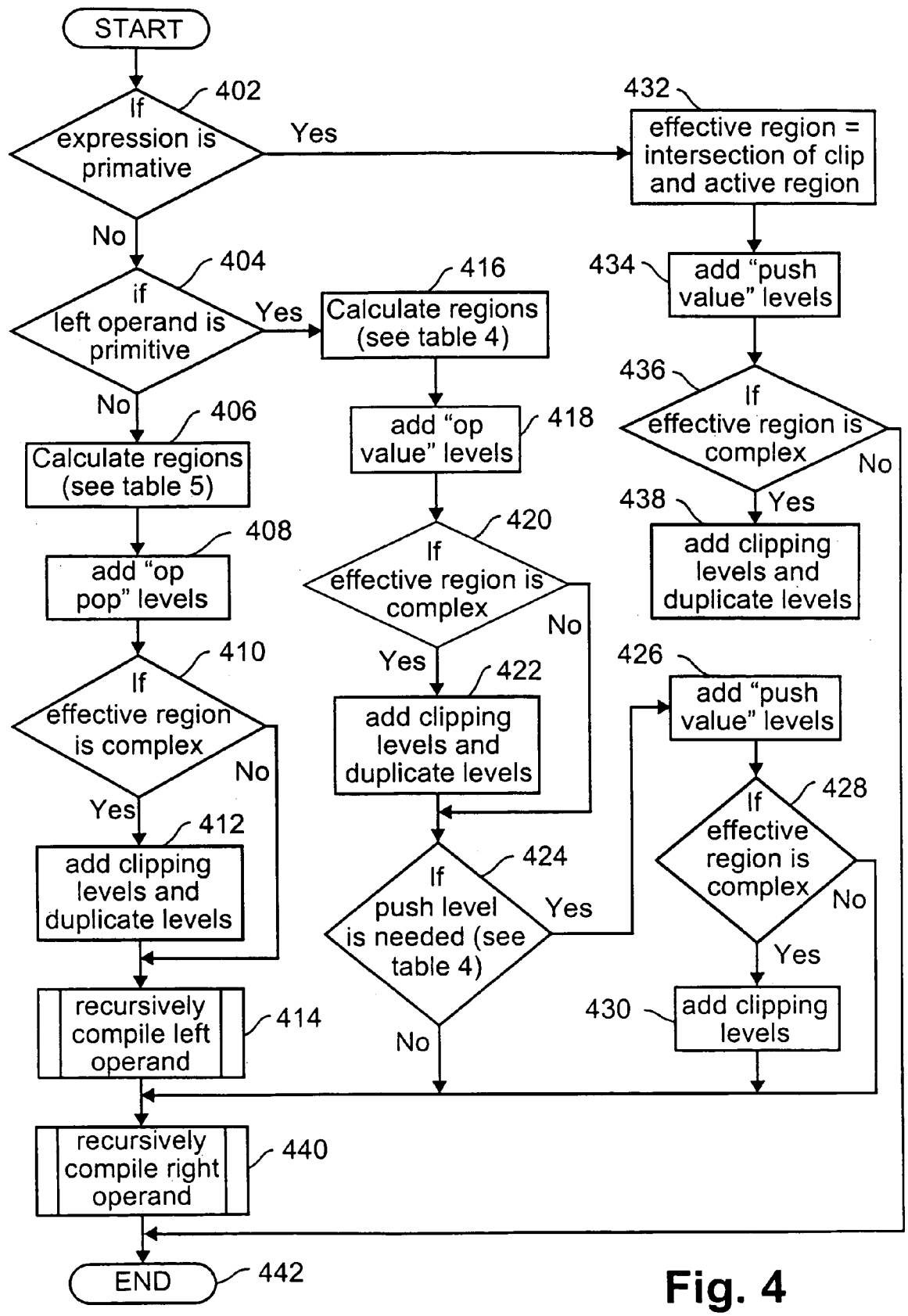
FIG. 4 is a flow diagram of a method of compiling an optimal level activation table in accordance with the embodiments of the invention.

FIG. 4 is a flow diagram of a method of compiling an optimal level activation table to optimally evaluate a given compositing expression in order to create an image in accordance with the embodiments of the invention. The method commences in step 402, where a check is carried out to determine whether the given compositing expression is "primitive" (i.e., represented by one "level" of the form push A). The processing continues in step 404, where if the expression is not primitive but is "complex" (i.e., represented by more than one active region), then a check is carried out to determine if the left operand of the expression is primitive. In the preferred compositing model, the left operand (i.e., the source fill data) for an operation is taken from the current level and the right operand (i.e., the destination fill data) is popped from the top level of the stack. In the next step 406, if the left operand of the expression is not primitive, then the effective region of the left operand is calculated using level activation table compilation rules for complex left operands (see Table 5 attached) in accordance with the embodiments of the invention. The effective region and the level activation table compilation rules will be described in more detail later in this document. The processing continues in step 408, where a "pop" level is added to the optimal level activation table of the given compositing expression. The pop level is a level that represents an operation to pop its left operand from the stack, during the compositing of the optimal level activation table, rather than explicitly being part of the level. In the next step 410, a check is carried out to determine if the effective region is "complex". Complex, in this context, means any effective region that involves more than one object boundary. If the effective region is complex, then clipping levels, and duplicate levels if necessary, are added to the optimal level activation table of the compositing expression in step 412. Duplicate levels only need to be added if the effective region for the operation is complex. In addition, if the disjunctive form of the Boolean expression for the clipping region involves any unions, the level that is being clipped will need to be duplicated. The clipping region of the left operand is the minimum region in which the left operand needs to be evaluated in order to be able to evaluate the compositing expression in which it is contained. Therefore, the clipping levels are added to the optimal level activation table to avoid unnecessary pixel operations during compositing. Clipping regions and clipping levels will be further explained later in this document. The processing continues in step 414, where if no clipping levels need to be added or after the necessary clipping and duplicate levels have been added to the optimal level activation table, the method outlined by the flowchart is repeated in order recursively to compile the levels of the level activation table for the left operand of the left operand of the given compositing expression.

If the left operand is primitive in step 404, then processing proceeds to step 416, where the left operand's effective region is calculated using the level activation table compilation rules for primitive left operands (see Table 4 below) in accordance with the embodiments of the invention. In the next step 418, the appropriate op value level is added for the left operand. As with pop and clip levels, duplicate op value levels can be added at this point to enable the compositing of a union of primitives or their complements. The processing continues in step 420, where a check is carried out to determine if the effective region of the left operand is complex. If the effective region is complex, then clipping levels, and necessary duplicate levels are added to the left operand of the compositing expression in step 422. The processing continues in step 424, where if no clipping levels need to be added or after the necessary clipping and duplicate levels have been added, a check is carried out on the effective region of the left operand to determine whether a "push" level needs to be added. The push level represents the case where the operation produces values that are equal to the left operand in the region where the right operand is missing. The push level increases the depth of the compositing stack. Duplicate push levels can also be added at this point if the effective region for the operation is complex. If required, the push levels are added to the level activation table, in the next step 426. Otherwise, the processing continues to step 440, where the right hand operand of the compositing expression is recursively compiled using the same method as for the left-hand operand.

In step 428, which follows step 426, a check is carried out to determine if the effective region of the left operand is complex. If the effective region is complex, then clipping levels, and necessary duplicate levels, are added to the level activation table of the compositing expression, in step 430. Otherwise, the processing continues in step 440, where the levels for the right-hand operand of the compositing expression are recursively compiled using the same method as for the left-hand operand. Once the levels for the right-hand operand of the compositing expression have been compiled, the optimal level activation table is complete and the processing terminates in step 442.

If in step 402, the given compositing expression is primitive, then processing continues to step 432, where the effective region of the given expression is calculated as the intersection of the active and clip regions of the given expression. In the next step 434, a "push value" level is added to the expression. Again, duplicate push levels can also be added at this point if the effective region for the operation is complex. The processing continues in step 436, where a check is carried out to determine if the effective region of the expression which resulted from the added push level is complex. If the effective region is complex, then clipping levels are added to the left operand of the compositing expression in step 438. Otherwise, the processing terminates in step 442.

Once the optimal level activation table has been compiled using the method of the described above, the stack machine of the preferred compositing model can begin compositing the expression represented by the level activation table in order to create an image in accordance with the embodiments. As discussed above, compositing of the optimal level activation table proceeds from the lowest level, up to the highest. At each level, the operation specified in the optimal level activation table is performed, and the result is pushed onto the compositing stack. It is has been found that there is a trade-off between the number of levels used and the number of pixel operations performed to evaluate the compositing expression. In some instances, the number of pixel operations performed can be reduced by introducing more levels.

The evaluation of the regions and methods of the preferred embodiment will now be discussed in more detail. For an explanation of mapping compositing expressions onto level activation tables, reference is made to the following example:

EXAMPLE

As seen in FIG. 3, for a given compositing expression 310 consisting of graphical objects and compositing operations, a natural mapping, obtained by evaluating the expression tree from right to left, produces a level activation table 300 from which the expression can be evaluated. The natural mapping of the level activation table occurs in four stages as follows:

1. Write the expression in Polish notation.
   i.e., over over in A B out C D E
2. Combine each operand that is adjacent to a graphic operand to form a level.
   i.e., over over (in A) B (out C) D E
3. Replace each remaining graphic with a level that pushes pixels from the graphic onto the stack.
   i.e., over over (in A) (push B) (out C) (push D) (push E)
4. Replace each remaining operator with a level that pops its source off the stack.
   i.e., (over pop) (over pop) (in A) (push B) (out C) (push D) (push E)

In the example,

| | |
|---|---|
| '(push X)' | denotes a level representing an operation where a colour value defined by fill X is pushed onto the stack. In this type of level, the left operand is explicitly designated by the level. |
| '(op X)' | denotes a current level with fill X and a colour operation op. The source fill data X for the operation is taken from the current level and the destination fill data is popped from the top level of the stack. |
| '(op pop)' | denotes a level representing an operation op where a colour value defined by fill X is popped from the stack. In this type of level, the left operand is explicitly designated by the level. |

The result of the natural mapping of the compositing expression 310 is the level activation table 300 which looks like a flattened expression tree where each sub-expression corresponds to a contiguous subset of the table 300. The same table entries can also be calculated by an algorithm that recursively processes each sub-expression in a single pass through the expression tree. Expressions can be processed either right to left or left to right, depending on the order in which the levels need to be generated. The expression tree 310 will be evaluated correctly inside the intersection of the active regions of all sub-expressions using the level activation table 300. However, for pixels outside that region, there is no guarantee that the preferred compositing model will calculate the correct value using the level activation table 300 generated by the natural mapping. Therefore, extra work is needed to produce correct optimal level activation tables.

The method of the preferred embodiment uses active region analysis, to avoid redundant pixel operations by clipping operations to the regions in which both of their operands are available. The method can also clip operands to the region in which the operations that will be applied to them produce non-transparent pixels. In most instances, region analysis is necessary to produce correct level activation tables as will be discussed below. The method of the preferred embodiment can evaluate any given compositing expression provided that there are sufficient levels available to represent the expression, and sufficient stack space to evaluate the expression.

Performing unnecessary compositing operations can be avoided by only performing an operation when its level is active; i.e., the operation is only performed for pixels that lie inside the active region of the graphical object corresponding to the level. This behaviour is both efficient and close to correct, but as discussed above it does not always produce the correct result for all compositing expressions. Unfortunately, the level activation tables generated using the natural mapping discussed above will only produce the correct pixel values under special circumstances or for special types of expressions.

The preferred compositing model described above works best with an expression tree that leans to the right. Ideally, each compositing operation corresponds to a single level in the level activation table. In this situation, each level in the table refers to an object plus an operation to combine the object's pixels with the top of the compositing stack. In this case, the number of pixels on the compositing stack will never be more than one.

If the expression tree leans entirely to the right and the expression contains no in, rin, out or ratop operations, the resulting level activation table will correctly compute the value of the expression for every pixel on the page. If the expression does not fall into this category, careful consideration of the active region of each sub-expression is required to understand how to make the compositing model calculate the correct pixel value. The necessary modifications to the level activation table will involve adding extra clipping levels and/or replacing levels with sets of levels which compute different operations in different regions of the page.

If a compositing operation is performed when the stack is empty, it is known that this can be compensated for by using an opaque white colour value as the right operand. However, in such a case one or more extra levels can preferably be added to the level activation table that each represent a push of the background colour onto the stack. Over operation levels are also required to render the expression correctly.

The problem is that the decision not to do any processing needs to take into account the active regions of both of the operands. The preferred compositing model either applies the operation everywhere on the page or only inside the left operand's active region. There are several situations where incorrect results will be produced with the simple natural mapping of expressions onto level activation tables as described above:

1. In the case of a level that takes its source from the fill table, the operation is applied inside the boundaries of the source operand. This means that a stack operation is sometimes applied when the pixels of the destination operand have not been placed on the stack by levels below.

2. The results of some compositing operations affect pixels that are outside the active region of the source operand, so levels which take their source pixels from the fill table will not always be active in the correct area. For example, rin makes pixels that lie outside the source operand's active region transparent.

3. In the case of a level which pops its source off the stack, the operation is applied everywhere regardless of whether its operands have actually been placed on the stack or not by lower levels.

The simplest way to solve these problems is to replace each primitive sub-expression, A, in the compositing expression with A over glass, where glass represents a transparent fill the size of the whole page. If an expression of this form is converted to a level activation table via the natural mapping, the stack depth at any given level will be the same for every pixel in the page. The resulting table will always compute the correct value for every pixel, but when using this approach, every level except the newly added over levels will be active for the entire page. This results in more pixel operations being performed than necessary.

In order to produce a more efficient solution, it is necessary to pay careful attention to the region in which each sub-expression is active. Ideally, each level should only perform a stack operation inside the smallest region outside of which it can be determined (by region analysis) that the resulting pixels will be transparent. Operations only need be performed in the region in which both operands are active.

Tables 1 and 2, attached, show level activation table entries implementing compositing operations if the active regions of the objects are not considered. Table 1 illustrates problems 1 and 2 for each compositing operation, and Table 2 covers problem 3. The "Operation" column in each table contains an expression to be evaluated by applying a compositing operation. The "Region" column lists all combinations of the active regions of the operands and the "Value" column gives the correct value of the compositing expression for each combination. The "Level" column indicates the level that is used to implement the operation. Table 1 shows operations where the source is taken from the fill table. Table 2 shows operations that take (i.e., pop) their source off the stack.

In Table 1, the "Stack" column shows the pixel on top of the stack. The "Result" columns indicate the value that the level will calculate. The operations in Table 1 do not change the stack depth, they replace the destination pixel on top of the stack with the result shown in the "Result" column. In Table 2, the "Stack" column shows the values of the top two pixels on the stack (the left one is the top of the stack). The operations in Table 2 always replace the top two values on the stack with the result of the operation shown in the "Result" column, thus reducing the stack depth by 1.

An expression containing a question mark indicates that an unknown value from the top of stack is used. If the stack is not empty, this results in the stack depth being incorrectly reduced and the wrong value being pushed onto the stack. If the stack is empty, this is not a problem since the compositing model will substitute an opaque white pixel for the operand. A question mark by itself indicates that the top of stack is left unchanged. It is assumed that the part of the table responsible for computing each operand pushes exactly one pixel onto the stack inside the active region of the sub-expression and does not push anything outside the active region.

The "Correct" columns shows the operation that needs to be performed in order to leave the correct value on the stack. The result in the "Correct" columns take into account the active regions. However, they do not take into account any clipping and in some cases a pop is required to remove an unused pixel that is outside the active region of the expression. The operand pop indicates that the operand is the top of stack, which is popped off the stack before pushing the result onto the stack. Further optimisations described below will add extra clipping levels to avoid generating the pixels that need to be popped. In Table 2 the operations in the "Correct" column are assumed to pop both of their operands off the stack before pushing the result onto the stack.

Note that in some cases, a push operation replaces the compositing operation. Where a push appears, the increase in stack depth compensates for the fact that the destination operand is assumed to be missing from the stack.

The active region of a graphical object was defined above as a region outside of which the object is known to be transparent. The following paragraphs describe exactly what the active region of an expression is and how to calculate it.

The definition of active regions can be extended to arbitrary compositing expressions by defining the active region of an expression to be the smallest region outside of which the expression is known to evaluate to glass.

The active region of any compositing expression can be calculated by applying some rules, as illustrated in Table 3 below, to combine active regions of sub-expressions. For each compositing operation, the active region of the result of the operation can be defined in terms of the active regions of its operands. For example, the active region of A over B is the union of the active regions of A and B.

Figure 5:
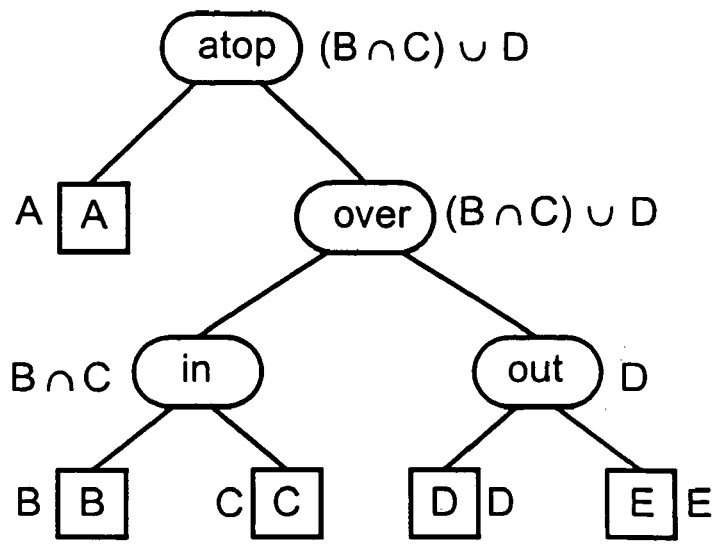
FIG. 5 shows an expression tree in which the expression for the active region is shown next to each level in accordance with the embodiments of the present invention.

The active region of an expression can be calculated by recursively applying the rules shown in Table 3 to each sub-expression. These rules are applied from the bottom of the tree upward towards the root. FIG. 5 illustrates an expression tree 500 in which the expression for the active region is shown next to each level.

Note that in some cases, the active region of a sub-expression may not be contained in the active region of an expression in which it appears. In these cases, the sub-expression will generate pixels that will not be needed higher up the expression tree. To avoid unnecessary pixel operations each sub-expression needs to be clipped to the intersection of the active regions of each expression in which it appears. Therefore, the clipping region of a sub-expression can be defined to be the intersection of the active regions of all of the (sub-)expressions in which it appears. As discussed above, the clipping region of a sub-expression is the minimum region in which the sub-expression needs to be evaluated in order to be able to evaluate the expression in which it is contained.

Clipping regions are calculated downward from the root of the expression tree towards the leaves. The clipping region for each sub-expression in a compositing expression can be calculated using the follow steps:

1. Label each sub-expression with its active region;

2. Set the clipping region for the top-level expression to be its active region; and 3. Recursively set the clipping region of each sub-expression to the intersection of its active region and its parent's clipping region.

Figure 6:
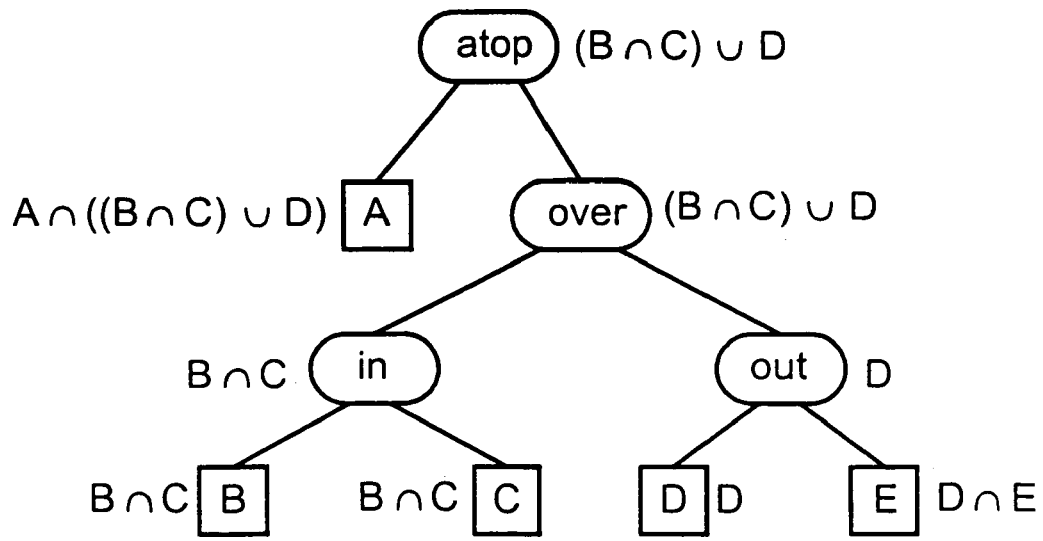
FIG. 6 shows the expression tree of FIG. 5 in which the expression for the clipped active region is shown next to each level in accordance with the embodiments of the present invention.

FIG. 6 illustrates an expression tree 600 whereby the root node of each sub-expression in the expression tree 600 is labelled with the clipping region of the sub-expression. For example, the clipping region of the sub-expression D out E is D.

Figure 7:
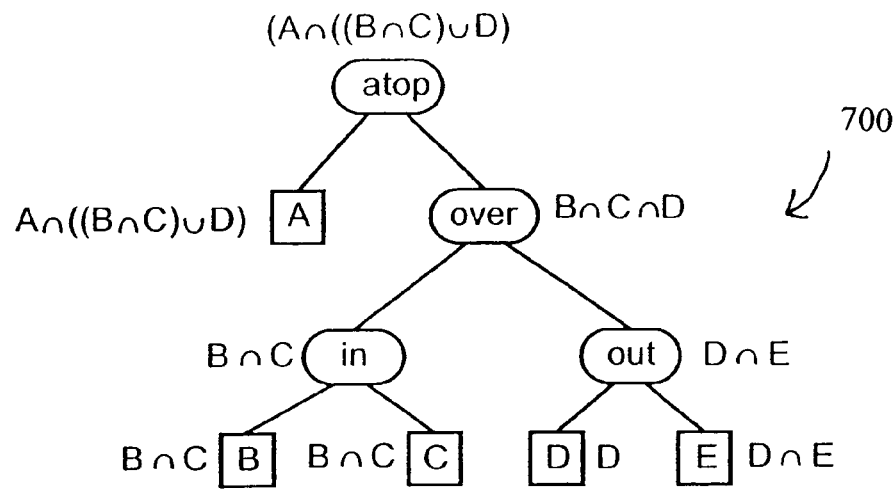
FIG. 7 shows the expression tree of FIG. 5 in which the expression for the effective region is shown next to each level in accordance with the embodiments of the present invention.

The clipping region is the smallest region in which each sub-expression needs to be evaluated. However, to evaluate expressions correctly, each operation should only be applied in the region inside which both of its operands are available, i.e., in the intersection of their clipping regions. This region is called the effective region of the operation. Note that the effective region of an operation is generally not the same as the clipping region of the sub-expression that the operation forms the root thereof. The effective region is usually a proper subset of the clipping region of the sub-expression that it is the root of. FIG. 7 illustrates an expression tree 700 whereby the root node of each sub-expression in the expression tree 700 is labelled with the effective region of the sub-expression. For example, the effective region of the sub-expression D out E is D∩E. Leaf nodes can be considered to be push operations whose effective regions are the same as their clipping regions.

The effective region of each sub-expression of an expression tree is used in the method described above to compile compositing expressions into an optimal level activation table. Unfortunately, effective regions can be arbitrarily complex Boolean expressions which are not supported by the preferred compositing model. This problem can be overcome because every Boolean expression can be rewritten in disjunctive form, as a disjoint union of intersections of primitives or the complements of primitives. Effective regions in disjunctive form can be compiled into level activation tables that will perform the necessary calculations.

Figure 8:
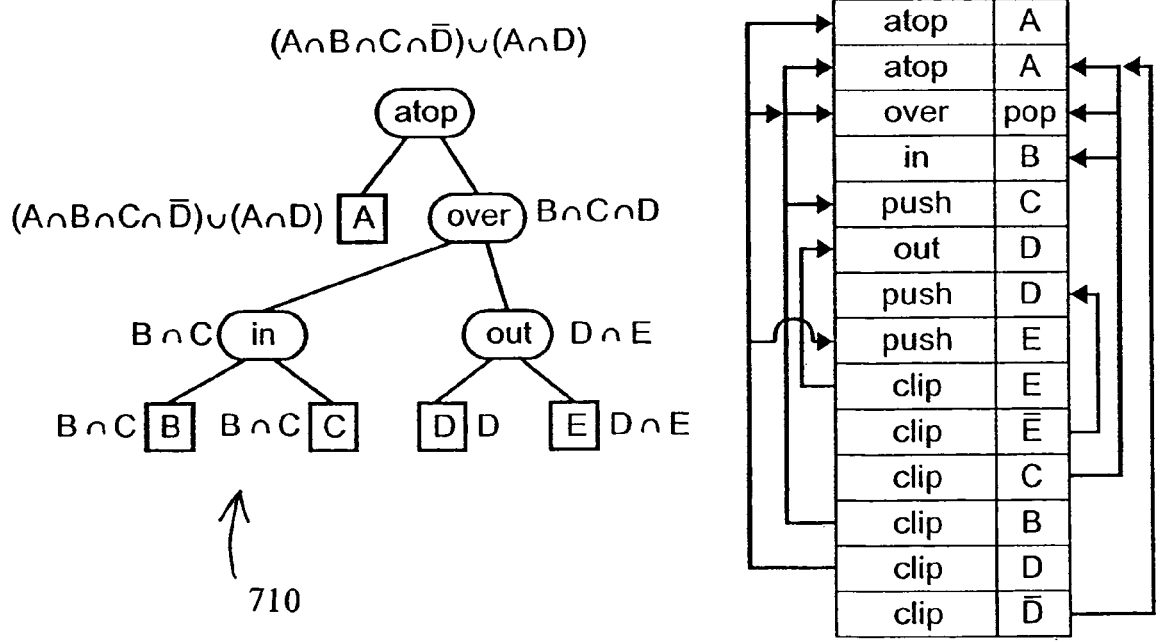
FIG. 8 shows an optimal level activation table for the expression tree of FIG. 5, in accordance with the embodiments of the present invention.

FIG. 8 shows an optimal level activation table for the expression 700, of FIG. 7, written in its disjunctive normal form 710. All of the effective regions except the atop and its argument are simple intersections of primitive regions or their complements. The atop and its argument need to be clipped to (A∩(B∩C)∪D) which can be rewritten as (A∩B∩C∩$\overline{D}$)∪(A∩D).

The sub-expression D out E of FIG. 7 is represented by three levels in the table 800. It is represented by the push E level the out D level and the push D level. The extra push D is needed because the out operation will not generate correct results outside D∩E. Whenever a primitive is the left operand of an operation with the same effective region, the primitive can be combined with the operation into a single level. If not, there needs to be an extra push level, which is active only outside the effective region of the operation. This ensures that the push is never active at the same time as the operation that it replaces. In all other cases in the example, the clipping region of each left primitive is the same as the operation that composites it onto the page, so the push can be combined with the operation.

As seen in FIG. 8, the atop A level is duplicated as two levels. As discussed above in connection with FIG. 4, this is to allow a single level to be clipped to a union of primitives or their complements. The first atop A is active in the region A∩D, and the second is active in A∩B∩C∩$\overline{D}$. Since the effective regions of the two levels are disjoint, at most one of them is active at any one time. Together, the two levels perform the operation in the region (A∩B∩C∩$\overline{D}$)∪(A∩D).

Tables 4 and 5 summarise the rules for compiling compositing expressions into level activation tables according to the embodiments of the invention. These tables are derived by combining information from Tables 1, 2, and 3. All expressions fall into three categories:

1. Primitive expressions: represented by one level of the form push A;

2. Expressions whose primary operation has a primitive left operand: Table 4 describes the levels needed to evaluate these; and 3. Expressions whose primary operation has a complex left operand: Table 5 describes the levels needed to evaluate these.

The "Levels" columns of Tables 4 and 5 show the levels needed to implement the operation for a sub-expression. The "Clip" column shows the region that each level needs to be clipped to. The region denoted by "clip" in the "Clip" column is the region that is passed down recursively to the sub-expression. In the "Clip" column "A" and "B" denote the active regions of the sub-expressions A and B. For example, for a sub-expression of the form A out B clipped to a region clip, where A is a primitive, Table 4 shows that the sub-expression can be evaluated using a sub-table to implement the sub-expression B and two levels (push A and out A) to implement the out operation. The sub-table is represented by "table B" in the "Levels" column of Table 4. The push A level should only be active in the intersection of clip and the complement of the active region of B. The out A level should only be active in the intersection of clip and the active region of B. The sub-table that implements B is generated by applying the same rules recursively with a clip region equal to the intersection of clip and the active region of A.

The region analysis described above did not take into account any knowledge about the opaqueness of objects. If it is known that some of the objects are fully opaque, further optimisations become possible. The opacity channel of each object in an expression can be checked to determine the transparent nature of each object. This check can be carried out prior to the step of calculating the regions in the method of the preferred embodiment.

The opaque region of an expression can be defined to be the region in which it is known to be fully opaque. The opaque region of an expression is always a subset of its active region. If the opaque regions of the sub-expressions of an expression are known, the active regions in the expression can be further refined. Opaque regions can be calculated in a similar way to active regions. Table 6 gives rules for calculating opaque regions of complex expressions, and an updated set of rules for calculating clipping regions and active regions. Table 6 is a condensed version of Table 5 combined with Table 3 refined to take into account opaque regions. The opaque regions of A and B are denoted: $O_A$ and $O_B$ respectively. The "Clip A" and "Clip B" columns give the clipping regions of the sub-expressions A and B. The parent expression's clipping region is not explicitly shown, but it must be included when calculating clipping regions of a sub-expression.

As seen in Table 6, the active regions are smaller in some cases when it is known that one or both of the operands are opaque or partially opaque. In cases when an operand is fully opaque, performing a pixel operation can be avoided altogether. For example, to evaluate A over B, when A is opaque, the effective region is $A \cap (B \cap \overline{O}_A = A \cap B \cap \overline{A} = \emptyset$.

In accordance with a further embodiment of the present invention, an expression representing an image to be rendered on a page, is preferably stored as a text file. The expression consists of objects and compositing operations. Each object is preferably defined by an outline and a fill. A fill consists of colour information and transparency information for the object, possibly in the form of a bitmap image. Fill information can be part of the expression, in accordance with the preferred embodiment, or the fill can be stored in a file referenced by the expression. The outline of an object represents the region inside which the object's colour information applies. Pixels outside the outline are assumed to be transparent. Each compositing operation represents an operation to be computed for every pixel in the page.

Figure 13:
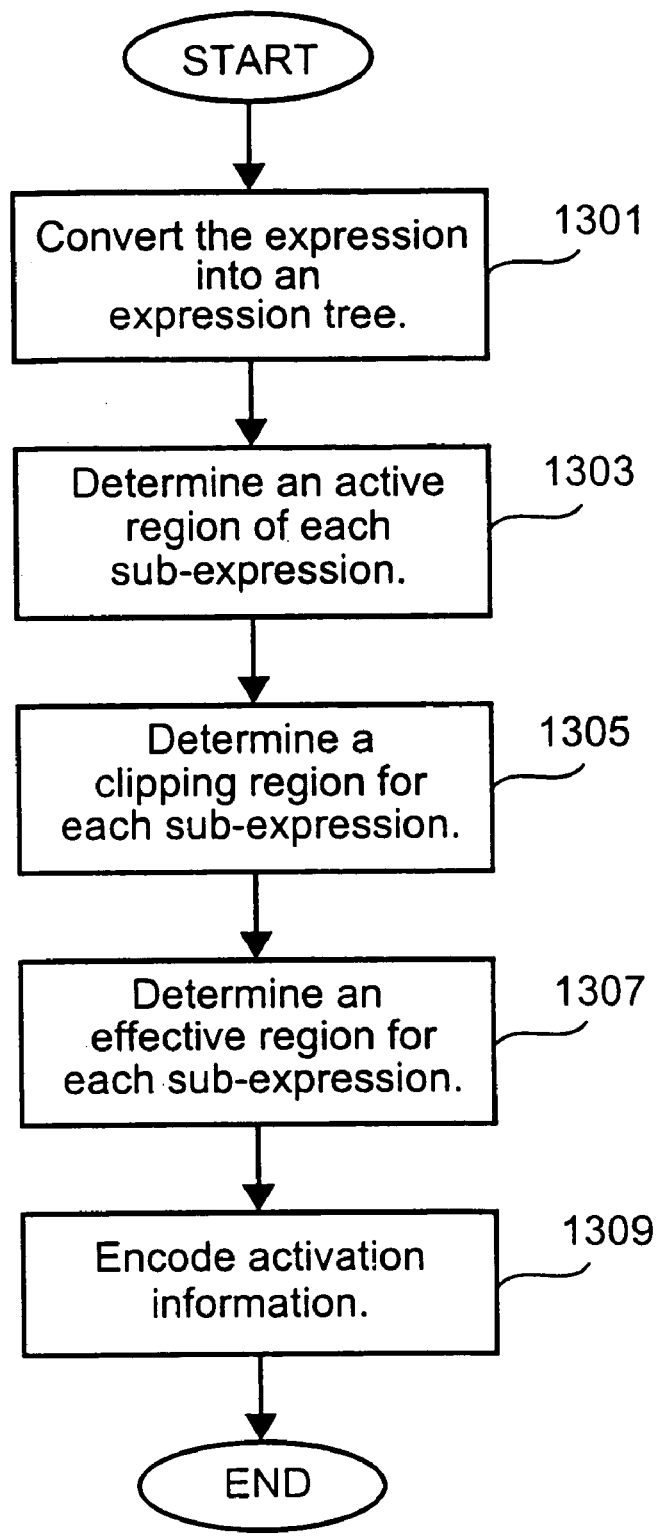
FIG. 13 is a flow chart showing a method of creating an image in accordance with another embodiment of the present invention.

The embodiments of the invention reduce the amount of work done by a rendering apparatus by calculating for each compositing operation in an expression to be rendered, the smallest region of the page in which the operation, needs to be performed. In accordance with the further embodiment, regions are calculated as boolean expressions. These expressions are preferably represented as expression trees. Encoding the information into a level activation table, as discussed above, involves processing the information in the expression tree into an expression table. FIG. 13 is a flow diagram showing a method of creating an image in accordance with the further embodiment of the present invention. The process begins in step 1301, where the expression representing an image to be rendered, is parsed and converted into an expression tree. Each node in the expression tree corresponds to a sub-expression of the original expression, with the root node representing the whole expression (i.e., the complete image). In the next step 1303, for each sub-expression (i.e., for each node in the expression tree) the smallest region in which the result of the compositing operation is known to be non-transparent is calculated. This region is referred to as the active region of the sub-expression, as discussed above. The active region of an operation node depends on the active regions of the operands of the operation and the type of operation. The active region of an object is defined to be the region inside the object's outline. Active regions are calculated in step 1301 by starting at the leaves of the expression tree and working towards the root of the expression tree using the following sub-steps:

a) For each object in the expression (i.e., for each leaf node in the expression tree), set the active region to be the region defined by the outline of the object.

b) For each operation whose operands' active regions are already known, calculate the operation's active region according to rules defined in table 3.

c) Repeat step b until all active regions have been calculated.

The process continues in step 1305, where a clipping region is calculated for each sub-expression in the expression. The clipping region is calculated as the intersection of the active regions of each (sub-)expression in which the (sub-)expression appears. As discussed above, the clipping region represents the region in which the pixels in the sub-expression contribute to the final image. Clipping regions are calculated in step 1305 by starting at the root of the expression tree and working towards the leaves using the following sub-steps:

a) Set the clipping region of the root node associated with the sub-expression to be equal to the sub-expression's active region.

b) For each operation node whose clipping region has already been calculated, determine the clipping region of each operand using the rules defined in table 4.

c) Repeat step b until all clipping regions have been calculated.

In the next step 1307, an effective region is calculated for each node in the tree. As discussed above, the effective region represents the region in which a stack operation needs to be generated for the operation associated with the node. Effective regions for each node in the tree are calculated in step 1307 by setting the effective region for a node to the intersection of the node's clipping region and active region, if the node is a leaf node. Otherwise, if the node is an operation node, setting the effective region to be the intersection of the active regions of the node's operands and the node's clipping region. The process continues to the next step 1309, where the activation information (i.e., the active, effective and clipping region information) is encoded into a form that can be rendered efficiently using a hardware or software renderer. Such a renderer preferably comprises a means for performing pixel based rendering operations and a means for limiting the rendering operations depending on whether a current pixel belongs to a region or not.

In accordance with a still further embodiment of the present invention, steps 1305 and 1307 can be combined into a single pass. Table 4 gives rules for combining steps 1305 and 1307 in accordance with the still further embodiment. Step 1309 is dependent on the rendering hardware. Further, step 1307 can also be performed in the same pass as steps 1305 and 1307.

When it is known that all or some of the objects of an expression are opaque, further calculations can be added to refine the associated active regions and hence also the effective regions to further reduce the number of pixel compositing operations required to render the expression.

In accordance with a still further embodiment of the present invention, calculation of opaque regions can be added to step 1303 of FIG. 13. Opaque regions can be calculated in a manner similar to active regions by applying the rules defined in table 6. The opaque region of an operation node depends on the active and opaque regions of the node's operands and on the operation being performed.

When opaque regions are introduced, the calculation of active regions is modified. The active region of an operation node also depends on both the active and opaque regions of the node's operands and on the operation being performed. Clipping regions and effective regions depend only on active regions, so calculation of clipping regions and effective regions, in accordance with the embodiments of the invention do not change when opaque regions are introduced. Step 1303 can modified to include opaque regions by firstly calculating for each sub-expression (i.e., for each node in the expression tree) the smallest region in which the expression is known to be non-transparent and the largest region in which the expression is known to be opaque. These regions are called the active and opaque regions of the sub-expression. The active and opaque regions of an operation node each depend on the active and opaque regions of the operands of the operation and on the type of operation. As discussed above, the active region of an object is defined to be the region inside the object's outline. In contrast, the opaque region of an object is empty if the object is not known to be opaque, and is the region inside the object's outline if the object is known to be opaque.

Active regions and opaque regions can be calculated in step 1303 by starting at the leaves of the expression tree and working towards the root using the following sub-steps:

a) For each object in the expression (i.e., for each leaf node in the expression tree), setting the active region to be the region defined by the outline of the object and setting the opaque region to be the region defined by the outline of the object if the object is opaque and setting the opaque region to be empty otherwise.

b) For each operation whose operand's active and opaque regions are already known, calculating the operation's active and opaque regions according to the rules defined in table 6.

c) Repeating step b until all active and opaque regions have been calculated.

The aforementioned preferred methods comprise a particular control flow. There are many other variants of the preferred methods, which use different control flows without departing from the spirit or scope of the invention. Furthermore, one or more of the steps of the preferred methods can be performed in parallel rather sequentially. In particular, steps 1203 and 1225 of FIG. 12 can be performed in parallel.

Appendix A gives a pseudocode implementation of a compiler for compositing expressions which produces optimal level activation tables in accordance with the embodiments of the invention. The pseudocode syntax is close to C++ while avoiding use of C++ constructs. The compiler is not intended to be efficient. Its purpose is to illustrate how to compile compositing operations. A real implementation would preferably not be written recursively. Further, the compiler seen in Appendix A does not take into account opaque regions. Finally the pseudocode implementation assumes that several abstract data types are available: Expression, Operation, Region, Table, and Level. These represent compositing expressions, compositing operations,
Boolean expressions representing regions of the page, level activation tables, and individual levels in a level activation table, respectively.

The preferred embodiment of the present invention is described as a computer application program hosted on the Windows™ operating system developed by Microsoft Corporation. However, those skilled in the art will recognise that the described embodiment may can be implemented on computer systems hosted by other operating systems. For example, the preferred embodiment can be performed on computer systems running UNIX™, OS/2™, DOS™. The application program has a user interface which includes menu items and controls that respond to mouse and keyboard operations. The application program has the ability to transmit data to one or more printers either directly connected to a host computer or accessed over a network. The application program also has the ability to transmit and receive data to a connected digital communications network (for example the "Internet").

The embodiments of the invention can be practised using a (host) computer system, such as the computer system 1 shown in FIG. 9, wherein the application program discussed above and described with reference to the other drawings is implemented as software executed on the computer system 1.

Typically, the application program of the preferred embodiment is resident on a hard disk drive 5 and read and controlled using the processor 2. Intermediate storage of the program and the print list and any data fetched from the network may be accomplished using semiconductor memory, possibly in concert with the hard disk drive 5. In some instances, the application program may be supplied to the user encoded on a CD-ROM or floppy disk, or alternatively could be read by the user from the network via a modem device (not illustrated).

The embodiments can alternatively be implemented in dedicated hardware such as one or more integrated circuits performing the functions or sub-functions of the steps of the method. Such dedicated hardware can include graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention.

For example, the method of the preferred embodiment could be used in a system that uses a data flow processor rather than a stack machine to composite graphic object data.

Further, the method described above is not limited to the compositing of graphics objects.

Appendix A

```
/*
 * Compile a compositing expression.
 * Returns a level activation table which evaluates the
 * expression.
 */
Table compile(Expression e)
{
    return compile(e, activeRegion(e));
}
/*
 * Recursive compiler for compositing expressions.
 * Returns a level activation table which evaluates an
 * expression clipped to a given clip region.
 */
Table compile(Expression e, Region clip)
{
```

```
Table table; // an empty level activation table
// Handle primitive expressions and right hand leaf nodes.
if(isPrimitive(e))
{
    addLevels(table, PUSH, e, clip);
    return table;
}
Operation op = operation(e);
Expression left = leftOperand(e);
Expression right = rightOperand(e);
Region leftActive = activeRegion(left);
Region rightActive = activeRegion(right);
addLevels(table, op,
            intersection(clip,
                intersection(leftActive, rightActive)));
if(isPrimitive(left))
{
    // Add a level to implement the primary operation
    // combined with the left hand operand
    addLevels(table, op, left,
                    intersect(clip, rightActive));
    // Add an extra push for operations that need it.
    switch(op)
    {
        case OVER:
        case ROVER:
        case OUT:
        case RATOP:
        case XOR:
            addLevels(table, PUSH, left,
                    intersect(clip, complement(rightActive)));
            break;
        default:
            // Don't do anything.
            break;
    }
}
else
{
    // Calculate the effective region for the operation.
    Region effective = intersect(clip,
                        intersect(leftActive, rightActive));
    // Add a level (possibly with duplicates) to evaluate
    // the primary operation. The level takes its source
    // from the stack.
    addLevels(table, op, POP, effective);
    // Compile the left-hand operand.
    switch (op)
    {
        case OVER:
        case ROVER:
        case OUT:
        case RATOP:
        case XOR:
            append(table, compile(left, clip));
            break;
        default:
            append(table,
                compile(left,
                    intersect(clip, rightActive)));
    }
}
// Compile the right hand operand, and append its levels to
// the table.
switch (op)
{
    case IN:
    case RIN:
    case OUT:
    case RATOP:
        append(table, compile(right,
                        intersect(clip, leftActive)));
        break;
    default:
        append(table, compile(right, clip));
}
return table;
}
/**************************************************************/

/* Operations on Regions                                      */
/**************************************************************/
/*
 * Returns false if the region is not empty, but will not
 * always return true if it is. This is a quick test to
 * eliminate empty regions.
 */
bool testIfEmpty(Region region);
/*
 * Returns the number of disjuncts in a Boolean expression.
 */
int numDisjuncts(Region expr);
/*
 * Returns the disjunct at a given index in a Boolean expression.
 */
Region getDisjunct(Region region, int index);
/*
 * Returns the conjunct at a given index in a Boolean expression.
 */
Region getConjunct(Region region, int index);
/*
 * Normalize a boolean expression representing a region.
 * Returns a Boolean expression which is a disjoint union of
 * intersections of primitives or their complements.
 */
Region normalize(Region expr);
/**************************************************************/
/* Operations on Tables                                       */
/**************************************************************/
/*
 * Add levels to a level activation table to implement a given
 * operation with a given fill, clipped to a given region.
 * op can be a compositing operation or "PUSH".
 * fill can be a primitive expression or "POP".
 * Duplicate levels will be added if the clip region cannot be
 * represented as a simple intersection.
 */
void addLevels(
            Table & table,
            Operation op,
            Expression fill,
            Region clip)
{
    normalize(clip);
    for (int i = 0; i != numDisjuncts(clip); ++i)
        addClippedLevel(table, op, fill, getDisjunct(clip, i));
}
/*
 * Add a level plus clip levels to a level activation table.
 * The clipping region is expected to be in the form of an
 * intersection of primitive regions or their complements.
 */
void addClippedLevel(
            Table & table,
            Operation op,
            Expression object,
            Region clip)
{
    if(testIfEmpty(clip)) //If empty, don't add a level.
        return;
    Level level(op, fill(object));
    int index = append(table, level);
    for(int i = 0; i != numConjuncts(clip); ++i)
    {
        Region r = getConjunct(clip, i);
        addClip(table, index, r);
    }
}
/*
 * Append a level to a level activation table.
 * Returns the index of the added level.
 */
int append(Table & table, Level level);
/*
 * Adds a clip level to a level activation table.
 * If a clip level already exists for the given set of edges,
 * the level to be clipped is added to the existing level.
 * The clip argument must be a primitive region or its complement.
 * If it is a primitive region, the level added will be a CLIPIN.
```

-continued

```
* If it is a complement of a primitive, the added level will be
* a CLIPOUT.
*/
void addClip(Table & table, int index, Region clip).
```

The invention claimed is:

1. A method of creating a pixel image, the pixel image to be formed by rendering and compositing a plurality of graphical objects according to an expression tree representing a compositing expression for the image, at least one of said graphical objects being non-rectangular, the expression tree comprising a plurality of nodes arranged in a hierarchical structure, each of said nodes representing one of the objects or a compositing operation for combining graphical objects or results of other compositing operations, each of the graphical objects having a predetermined object outline forming a region comprising a plurality of pixels therein, said method comprising the steps of:

determining an active region for each of the graphical object nodes, the active region for each particular graphical object node being equal to the region inside the predetermined object outline for the graphical object represented by the particular graphical object node;

determining an active region for each of the compositing operation nodes, the active region for each particular compositing operation node being determined based on the active regions of each child node of the particular compositing operation node;

determining a clip region for each of the compositing operation nodes, the clip region for each particular compositing operation node being equal to the intersection of the active region of the particular compositing operation node and the clip region of a parent compositing operation node of the particular compositing operation node, at least one of the clip regions determined for one of the compositing operation nodes being smaller in area than the active region for said one compositing operation node;

determining an effective region for each of the compositing operation nodes, the effective region for each particular compositing operation node being equal to the intersection of the clip region of the particular compositing operation node and the active regions of the child nodes of the particular compositing operation node, at least one of said effective regions determined for one of said compositing operation nodes being smaller in area than the clip region for said one compositing operation node; and applying the compositing operation represented by each operation node to the pixels falling wholly within the corresponding effective region for the operation node to create the image, wherein pixels falling outside the effective regions are disregarded in applying the compositing operations and the arrangement of nodes in the hierarchical structure remains stable during the creation of the image.

2. A method according to claim 1, wherein each clip region is dependent upon an active region of a child node of a particular compositing operation node.

3. A method according to claim 1, wherein a wholly opaque object in a particular region acts to eliminate one or more compositing operation nodes contributing to at least one other object constituting the particular region, wherein the at least one other object is obscured by the wholly opaque object in a space in which the outlines are defined.

4. A method of creating a pixel image, the pixel image to be formed by rendering and compositing a plurality of graphical objects according to an expression tree representing a compositing expression for the image, at least one of said graphical objects being non-rectangular, the expression tree comprising a plurality of nodes arranged in a hierarchical structure, each of said nodes representing one of the objects or a compositing operation for combining graphical objects or results of other compositing operations, each of the graphical objects having a predetermined object outline forming a region comprising a plurality of pixels therein, said method comprising the steps of:

determining an active region corresponding to each of the graphical object nodes, the active region for each particular graphical object node being equal to the region inside the predetermined object outline for the graphical object represented by the particular graphical object node;

determining an active region for each of the compositing operation nodes, the active region for each particular compositing operation node being determined based on the active regions of each child node of the particular compositing operation node;

determining a clip region for the compositing operation nodes, the clip region for each particular compositing operation node being equal to the intersection of the active region of the particular compositing operation node and the clip region of a parent compositing operation nodes of the particular compositing operation node, at least one of the clip regions determined for one of the compositing operation nodes being smaller in area than the active region for said one compositing operation node;

determining an effective region for each of the compositing operation nodes, the effective region for each particular compositing operation node being equal to the intersection of the clip region of the particular compositing operation node and active regions of the child nodes of the particular compositing operation node, at least one of said effective regions determined for one of said compositing operation nodes being smaller in area than the clip region for said one compositing operation node;

mapping the effective regions and compositing operations associated with corresponding compositing operation nodes into a compositing table, comprising a plurality of levels, wherein each level of the compositing table represents one of the operators or an outline for clipping at least one other level; and compositing the image using the compositing table, wherein pixels falling outside the effective regions are disregarded in applying the compositing operations and the arrangement of nodes in the hierarchical structure remains stable during the creation of the image.

5. A method according to claim 4, wherein each of the clip regions is dependent upon an active region of a child node of a particular compositing operation node.

6. A method according to claim 4, wherein a level comprising a push operation is added to the compositing table.

7. A method according to claim 4, wherein a corresponding compositing expression corresponding to an active region is complex.

8. A method according to claim 4, wherein a level comprising a clip operation is added to the compositing table.

9. A method according to claim 4, wherein an active region is determined on the basis that the corresponding compositing operation node has a complex left operand.

10. A method according to claim 9, wherein a level comprising a pop operation is added to the compositing table.

11. A method according to claim 10, wherein the pop operation will remove any unused pixel being outside an active region representing the complex left operand, during compositing of the complex left operand.

12. A method according to claim 11, wherein the active region is the active region of the complex left operand.

13. A method according to claim 11, wherein the active region is transformed to an effective region by the pop operation.

14. A method according to claim 13, wherein the effective region is the effective region of the complex left operand.

15. A method according to claim 13, wherein the effective region corresponds to a complex expression.

16. A method according to claim 15, wherein a level comprising a clip operation is added to the compositing table.

17. A method according to claim 4, wherein an active region is determined on the basis that the corresponding compositing operation has a primitive left operand.

18. A method according to claim 17, wherein a level comprising a push operation is added to the compositing table.

19. A method according to claim 17, wherein the active region corresponds to a complex expression.

20. A method according to claim 19, wherein a level comprising a clip operation is added to the compositing table.

21. A method according to claim 4, wherein a level comprising an operation and a data fill value of a particular object constituting an active region, is added to the compositing table.

22. A method according to claim 4, wherein the compositing table is optimised in regard to the number of pixel operations required to render the image.

23. A method according to claim 4, wherein a wholly opaque object in a particular region acts to eliminate one or more compositing operations contributing to at least one other object constituting the particular region, wherein the at least one other object is obscured by the wholly opaque object in a space in which the outlines are defined.

24. A method of creating a pixel image, the pixel image to be formed by rendering and compositing a plurality of graphical objects according to a hierarchically structured compositing expression, each of the graphical objects having a predetermined object outline forming a region comprising a plurality of pixels therein and at least one of said graphical objects being non-rectangular, such that an object region formed by each particular object outline of each particular graphical object is wholly within the particular graphical object and is formed wholly from the plurality of pixels, the hierarchically structured compositing expression comprising a plurality of nodes arranged in a hierarchical structure, each of the nodes representing one or more compositing operations, each compositing operation being defined by at least one compositing operator and one or more operands, each of the operands representing one of the graphical objects or a sub-expression representing the result of another of the compositing operations, said method comprising the steps of:

determining an active region for at least each sub-expression of the hierarchically structured compositing expression, each active region being determined based on the operators contained in the corresponding sub-expression, such that the active region of each particular graphical object represented by a corresponding one of said sub-expressions is equal to the region inside the predetermined object outline for the particular graphical object;

determining a clip region for the sub-expressions, the clip region for each particular sub-expression being equal to the intersection of the active region of the particular sub-expression and the clip region of a parent compositing operation of the particular sub-expression, at least one of the clip regions determined for one of the sub-expressions being smaller in area than the active region for said one sub-expression;

determining an effective region for each of the compositing operations of the hierarchically structured compositing expression, the effective region for each particular compositing operation being equal to the intersection of the clip region of the particular compositing operation and the active regions of the operands of the particular compositing operation, at least one of said effective regions determined for one of said compositing operations being smaller in area than the clip region for said one compositing operation;

mapping each effective region and corresponding compositing operation into a compositing table, comprising a plurality of levels, wherein each level of the compositing table represents one of the operators or an outline for clipping at least one other level; and evaluating the hierarchically structured compositing expression using the compositing table, wherein pixels falling outside the effective regions are disregarded in applying the compositing operations and the arrangement of nodes in the hierarchical structure remains stable during the creation of the image.

25. The method according to claim 24, wherein said active regions are determined during an upward traversal of the hierarchically structured compositing expression and the clip regions are determined in a downward traversal of the hierarchically structured compositing expression.

26. A method of creating a pixel image, the pixel image to be formed by compositing at least a plurality of graphical objects according to one or more compositing operations, each graphical object having a predetermined object outline forming a region comprising a plurality of pixels therein and at least one of said graphical objects being non-rectangular, the one or more compositing operations comprising a plurality of nodes arranged in a hierarchical structure, each of the nodes representing one or more compositing operations, each compositing operation being defined by at least one compositing operator and one or more operands, each of the operands representing one of the graphical objects or a result of another of the compositing operations, said method comprising the steps of:

determining an active region for each of the graphical object operands, such that the active region of each particular graphical object represented by a corresponding one of said operands is equal to the region inside the predetermined object outline for said particular graphical object;

determining an active region for each of the compositing operations, the active region for each particular compositing operation being determined based on the active regions associated with each operand of the particular compositing operation;

determining an effective region for each of the compositing operations, wherein the effective region for each particular compositing operation is equal to the intersection of a clip region of the particular compositing operation and one or more of the active regions of the operands of the particular compositing operation, the clip region for each particular compositing operation being equal to the intersection of the active region of the particular compositing operation and the clip region of a parent compositing operation of the particular compositing operation, at least one of the clip regions determined for one of the compositing operations being smaller in area than the active region for said one compositing operation, at least one of said effective regions determined for one of said one compositing operation being smaller in area than the clip region for said one compositing operation;

mapping the effective regions and corresponding compositing operations into a compositing table, comprising a plurality of levels, wherein each level of the compositing table represents one of the operators or an outline for clipping at least one other level; and compositing the image using the compositing table, wherein pixels falling outside the effective regions are disregarded in applying the compositing operations and the arrangement of nodes in the hierarchical structure remains stable during the creation of the image.

27. A method according to claim 26, wherein each of the clip regions is dependent upon an active region of an operand of a particular compositing operation.

28. A method according to claim 26, wherein a level comprising a push operation is added to the compositing table.

29. A method according to claim 26, wherein a corresponding compositing expression corresponding to an active region is complex.

30. A method according to claim 26, wherein a level comprising a clip operation is added to the compositing table.

31. A method according to claim 26, wherein an active region is determined on the basis that the corresponding compositing operation has a complex left operand.

32. A method according to claim 31, wherein a level comprising a pop operation is added to the compositing table.

33. A method according to claim 32, wherein the pop operation will remove any unused pixel being outside an active region representing the complex left operand, during compositing of the complex left operand.

34. A method according to claim 33, wherein the active region is transformed to a still further region by the pop operation.

35. A method according to claim 34, wherein the effective region is the effective region of the complex left operand.

36. A method according to claim 35, wherein the effective region corresponds to a complex expression.

37. A method according to claim 36, wherein a level comprising a clip operation is added to the compositing table.

38. A method according to claim 33, wherein the active region is the active region of the complex left operand.

39. A method according to claim 26, wherein a further active region is determined on the basis that the corresponding compositing operation has a primitive left operand.

40. A method according to claim 39, wherein the active region corresponds to a complex expression.

41. A method according to claim 40, wherein a level comprising a clip operation is added to the compositing table.

42. A method according to claim 39, wherein a level comprising a push operation is added to the compositing table.

43. A method according to claim 26, wherein a level comprising an operation and a data fill value of a particular object constituting an active region, is added to the compositing table.

44. A method according to claim 26, wherein the compositing table is optimised in regard to the number of pixel operations required to render the image.

45. A method according to claim 26, wherein a wholly opaque object in a particular region acts to eliminate one or more compositing operations contributing to at least one other object constituting the particular region, wherein the at least one other object is obscured by the wholly opaque object in a space in which the outlines are defined.

46. A method of creating a pixel image, the pixel image to be formed by rendering and compositing a plurality of graphical objects according to a hierarchical structure representing a compositing expression for the image, at least one of said graphical objects being non-rectangular, the hierarchical structure including a plurality of nodes, each node being associated with either a compositing operator or an operand of the compositing expression, each operand representing one of the graphical objects or a result of a sub-expression of the compositing expression, each of the graphical objects having a predetermined object outline forming a region comprising a plurality of pixels therein, said method comprising the steps of:

determining an active region for at least each sub-expression of the compositing expression, such that the active region of each particular graphical object represented by a corresponding one of said sub-expression is equal to the region inside the predetermined object outline for the particular graphical object and the active region for each particular sub-expression being determined based on the active regions associated with further sub-expressions containing the particular sub-expression;

determining a clip region for the sub-expression, the clip region for each particular sub-expression being equal to the intersection of the active region of the particular sub-expression and the clip region of a parent compositing operation of the particular sub-expression, at least one of the clip regions determined for one of the sub-expressions being smaller in area than the active region for said one sub-expression;

determining an effective region for each of the nodes, each of the effective regions having a corresponding compositing operation, the effective region for each particular node being equal to the intersection of the clip region and the active regions associated with the child nodes of the particular node, at least one of said effective regions determined for one of said nodes being smaller in area than the clip region for said one node; and applying the corresponding compositing operations substantially to the effective regions to create the image, wherein pixels falling outside the effective regions are disregarded in applying the compositing operations and the arrangement of nodes in the hierarchical structure remains stable during the creation of the image.

47. The method according to claim 46, said method further including the steps of:

mapping the effective regions and the compositing operations into a compositing table comprising a plurality of levels, wherein each level represents at least one compositing operation for rendering an object or parts thereof or represents an outline for clipping at least one other level; and compositing the image using the compositing table.

48. The method according to claim 46, wherein the compositing operations include compositing and stack operations.

49. A computer readable medium storing a program for an apparatus which processes graphical objects intended to form a raster pixel image, the processing comprising a method of creating a pixel image, the pixel image to be formed by rendering at least a plurality of graphical objects to be composited according to a hierarchical structure representing a compositing expression for the image, at least one of said graphical objects being non-rectangular, the hierarchical structure including a plurality of nodes, each node being associated with either a compositing operator or an operand of the compositing expression, each of the operands representing one of the graphical objects or a result of a sub-expression of the compositing expression, each of the graphical objects having a predetermined object outline forming a region comprising a plurality of pixels therein, said program comprising:

code for determining an active region for at least each sub-expression of the compositing expression, such that the active region of each particular graphical object represented by a corresponding one of said sub-expression is equal to the region inside the predetermined object outline for the particular graphical object and the active region for a particular sub-expression determined based on the active regions associated with further sub-expressions containing the particular sub-expression;

code for determining a clip region for the sub-expressions, the clip region for each particular sub-expression being equal to the intersection of the active region of the particular sub-expression and the clip region of a parent compositing operation of the particular sub-expression, at least one of the clip regions determined for one of the sub-expressions being smaller in area than the active region for said one sub-expression;

code for determining an effective region for each of the nodes, each of the effective regions having a corresponding compositing operation, the effective region for each particular node being equal to the intersection of the clip region and the active regions associated with the child nodes of the particular node, at least one of said effective regions determined for one of said nodes being smaller in area than the clip region for said one node; and code for applying the corresponding compositing operations substantially to the effective regions to create the image, wherein pixels falling outside the effective regions are disregarded in applying the compositing operations and the arrangement of nodes in the hierarchical structure remains stable during the creation of the image.

50. The computer readable medium according to claim 49, said medium further storing:

code for mapping the effective regions and the compositing operations into a compositing table comprising a plurality of levels, wherein each level represents at least one compositing operation for rendering an object or parts thereof or represents an outline for clipping at least one other level; and code for compositing the image using the compositing table.

51. The computer readable medium according to claim 49, wherein the compositing operations include compositing and stack operations.

* * * * *

UNITED STATES PATENT AND TRADEMARK OFFICE
CERTIFICATE OF CORRECTION

| | | |
|---|---|---|
| PATENT NO. | : 7,190,376 B1 | Page 1 of 1 |
| APPLICATION NO. | : 09/524698 | |
| DATED | : March 13, 2007 | |
| INVENTOR(S) | : Alan Tonisson | |

It is certified that error appears in the above-identified patent and that said Letters Patent is hereby corrected as shown below:

SHEET 4:

FIG. 4, "primative" should read --primitive--.

SHEET 7:

FIG. 9, "Permenent" should read --Permanent--.

COLUMN 11:

Line 36, "is referred to" should be deleted.

COLUMN 20:

Line 48, "setting" should read --by setting--.

COLUMN 21:

Line 53, "sequentially." should read --than sequentially--.

COLUMN 31:

Line 39, "determined" should read --being determined--.

Signed and Sealed this

Twenty-third Day of September, 2008

JON W. DUDAS
*Director of the United States Patent and Trademark Office*